US012523271B2

(12) United States Patent
Gilmore et al.

(10) Patent No.: US 12,523,271 B2
(45) Date of Patent: Jan. 13, 2026

(54) VIBRATION ISOLATOR PRE-LOAD MECHANISM

(71) Applicant: Toyota Motor Engineering & Manufacturing North America, Inc., Plano, TX (US)

(72) Inventors: Paul A Gilmore, Ann Arbor, MI (US); Umesh Gandhi, Farmington Hills, MI (US); Ryohei Tsuruta, Ann Arbor, MI (US); Brian J Pinkelman, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 199 days.

(21) Appl. No.: 17/205,991

(22) Filed: Mar. 18, 2021

(65) Prior Publication Data

US 2022/0299084 A1    Sep. 22, 2022

(51) Int. Cl.
    *F16F 1/32*      (2006.01)
    *B60N 2/54*      (2006.01)
    *F16F 3/02*      (2006.01)
    *F16F 15/00*     (2006.01)
    *F16F 15/06*     (2006.01)

(52) U.S. Cl.
    CPC .......... *F16F 1/32* (2013.01); *B60N 2/54* (2013.01); *F16F 3/02* (2013.01); *F16F 15/002* (2013.01); *F16F 15/06* (2013.01); *F16F 2228/004* (2013.01); *F16F 2228/063* (2013.01)

(58) Field of Classification Search
    CPC ...... F16F 1/32; F16F 3/02; F16F 15/06; F16F 2228/063; B60N 2/54
    See application file for complete search history.

(56) References Cited

U.S. PATENT DOCUMENTS

| | | | | |
|---|---|---|---|---|
| 3,107,905 | A | * | 10/1963 | Lucas ........................ F16F 1/32 |
| | | | | 248/200.1 |
| 6,126,371 | A | | 10/2000 | McCloskey |
| 6,517,060 | B1 | | 2/2003 | Kemeny |
| 10,371,229 | B2 | | 8/2019 | Gandhi et al. |
| 10,443,677 | B2 | * | 10/2019 | Hattori ................... F16F 13/00 |

(Continued)

FOREIGN PATENT DOCUMENTS

| | | | | |
|---|---|---|---|---|
| DE | | 3302852 A * | 8/1984 | ................ F16F 1/32 |
| DE | | 10155183 A1 | 7/2003 | |
| JP | | 2017172733 A | 9/2017 | |

*Primary Examiner* — Robert A. Siconolfi
(74) *Attorney, Agent, or Firm* — HAYNES AND BOONE, LLP

(57) ABSTRACT

An apparatus includes a vibration isolator which incorporates at least two disk spring washers. Each disk spring washer has at least one ring-shaped outer spacer coupled to the outer edges of one or two of the disk spring washers, and at least one ring-shaped inner spacer coupled to the inner edges of one or two of the disk spring washers. A bottom attachment portion supports the disk spring washers, and a top attachment portion, with an application of a downward preload force, compresses the disk spring washers. A compression fixture applies and holds the preload force to the top attachment portion, and a second top attachment portion, with application of an additional downward force, further compresses the at least two disk spring washers.

14 Claims, 15 Drawing Sheets

(56) References Cited

U.S. PATENT DOCUMENTS

| | | |
|---|---|---|
| 10,677,310 B2 | 6/2020 | Gandhi et al. |
| 2007/0138720 A1* | 6/2007 | Evans ........................ F16F 1/32 |
| | | 267/162 |
| 2019/0186588 A1 | 6/2019 | Gandhi et al. |
| 2019/0186589 A1 | 6/2019 | Gandhi et al. |

* cited by examiner

VIBRATION ISOLATOR PRE-LOAD MECHANISM

TECHNICAL FIELD

The subject matter described herein relates to a vibration isolator pre-load mechanism. This vibration isolator pre-load mechanism has particular but not exclusive utility for reducing seat vibration in cars, trucks, and vans.

BACKGROUND

Seats in a vehicle (e.g., a car, truck, or van) often include seat pan or seat cushion pan attached to a seat frame, which attaches to a pair of sliding rails, which in turn are attached to the vehicle floor. To limit the transmission of vibration between the vehicle floor and the seat, vibration isolators may be placed between the sliding rails and the seat frame, or between the sliding rails and the floor. For example, linear spring vibration isolators may be used for this purpose. However, vibrations may still be felt in the seat base (e.g., the seat pan and/or seat frame), and may be transferred from the seat base to the seat back. Quasi-zero-stiffness (QZS) vibration isolators may be used in place of linear spring vibration isolators. However, the QZS property for the isolator occurs over a limited range of forces and deflections. Depending on the weight (e.g., passenger or cargo weight) placed on the seat, the QZS isolators may or may not be compressed into the QZS region of their force-deflection curves. A need exists for vibration isolation mechanisms that overcome this difficulty.

The information included in this Background section of the specification, including any references cited herein and any description or discussion thereof, is included for technical reference purposes only and is not to be regarded as subject matter by which the scope of the disclosure is to be bound.

SUMMARY

To reduce vibration transmission any given axis, a stacked disk isolator or quasi-zero-stiffness (QZS) isolator may be employed. By suitable selection of spring design parameters, a spring stack may be designed to produce a quasi-zero/negative stiffness response to a range of forces applied to the spring stack. A quasi-zero-stiffness response occurs when the spring stack compresses or uncompresses very easily in response to small changes in applied force, as though it had a stiffness or spring constant close to zero. For example, when subjected to a force in this design range of forces (e.g., when it is compressed into its quasi-zero-stiffness range), the spring stack may be deflected over a relatively wide range of values in response to little or no increase in the applied force. Explained differently, when the spring stack is in its quasi-zero-stiffness range, it may not "push back" against small changes in compressive force, but rather simply absorb them by compressing or "deflecting". Under these conditions, it has been found that transmission of vibrations from a first element (such as a vehicle floor or slide rail) to a second element (for example, a vehicle seat frame) may be eliminated or substantially attenuated.

In some cases, it may be desirable to apply an axial pre-load force on the spring stack of a QZS vibration isolator, sufficient for the stack to reach the quasi-zero/negative stiffness response range when a measured or expected weight is placed on the seat, so that the full benefit of the isolator can be realized. Disclosed is a vibration isolator pre-load mechanism that addresses the foregoing and other concerns.

The vibration isolator pre-load mechanism disclosed herein has particular, but not exclusive, utility for reducing seat vibration in cars, trucks, and vans. One general aspect includes an apparatus with a first vibration isolator including: at least two disk spring washers, where each disk spring washer includes an inner edge, an outer edge, and a central opening; at least one ring-shaped outer spacer, where each outer spacer is coupled to the outer edges of one or two disk spring washers of the at least two disk spring washers; at least one ring-shaped inner spacer, where each inner spacer is coupled to the inner edges of one or two disk spring washers of the at least two disk spring washers; a bottom attachment portion configured to support the at least two disk spring washers; and a first top attachment portion configured to, with an application of a first downward force, compress the at least two disk spring washers. The apparatus also includes a compression fixture configured to apply and hold the first downward force to the first top attachment portion; and a second top attachment portion configured to, with application of a second downward force, additional to the first downward force, further compress the at least two disk spring washers. Other embodiments of this aspect include corresponding computer systems, apparatus, and computer programs recorded on one or more computer storage devices, each configured to perform the actions of the methods.

Implementations may include one or more of the following features. In some embodiments, the first top attachment portion includes a plate or platform. In some embodiments, the second top attachment portion includes a plate or platform. In some embodiments, the second top attachment portion includes a plunger. In some embodiments, the first top attachment portion includes a plate or platform. some embodiments, the first downward force is a pre-load force selected to place the at least two disk spring washers in a quasi-zero-stiffness (QZS) range. In some embodiments, the first downward force is a pre-load force selected to place the at least two disk spring washers in a quasi-zero-stiffness (QZS) range when the second downward force is applied. In some embodiments, the compression fixture includes: a bottom enclosure; and a top enclosure configured to move vertically relative to the bottom enclosure. In some embodiments, the compression fixture further includes a pin or bolt configured to fix a position of the top enclosure relative to the bottom enclosure after the first downward force is applied. In some embodiments, the compression fixture further includes a motor configured to apply the first downward force. In some embodiments, the compression fixture further includes: a sensor configured to measure the second downward force; and a controller configured to adjust the first downward force based on the second downward force. In some embodiments, adjusting the first downward force places the at least two disk spring washers in a quasi-zero-stiffness (QZS) range. In some embodiments, adjusting the first downward force based on the second downward force places at least one of the first vibration isolator or the second vibration isolator in a quasi-zero-stiffness (QZS) range. In some embodiments, the apparatus further includes a second vibration isolator positioned above the first top attachment portion, such that the first downward force compresses the first vibration isolator and uncompresses the second vibration isolator, and such that the second downward force compresses both the first vibration isolator and the second vibration isolator. Implementations of the described techniques may include hardware, a method or process, or computer software on a computer-accessible medium.

One general aspect includes a vehicle with: a floor; a seat including; a backrest; a cushion; a frame; a slide rail configured to permit the seat to travel in a direction parallel to the floor; a first vibration isolator including: at least two disk spring washers, where each disk spring washer includes an inner edge, an outer edge, and a central opening; at least one ring-shaped outer spacer, where each outer spacer is coupled to the outer edges of one or two disk spring washers of the at least two disk spring washers; at least one ring-shaped inner spacer, where each inner spacer is coupled to the inner edges of one or two disk spring washers of the at least two disk spring washers; a bottom attachment portion configured to support the at least two disk spring washers; and a first top attachment portion configured to, with an application of a first downward force, compress the at least two disk spring washers. The vehicle also includes a compression fixture configured to apply and hold the first downward force to the first top attachment portion; and a second top attachment portion configured to, with application of a second downward force, additional to the first downward force, further compress the at least two disk spring washers. Other embodiments of this aspect include corresponding computer systems, apparatus, and computer programs recorded on one or more computer storage devices, each configured to perform the actions of the methods.

Implementations may include one or more of the following features. In some embodiments, the compression fixture includes: a bottom enclosure; a top enclosure configured to move vertically relative to the bottom enclosure; and a pin or bolt configured to fix a position of the top enclosure relative to the bottom enclosure after the first downward force is applied. In some embodiments, the vehicle further includes a second vibration isolator positioned above the first top attachment portion, such that the first downward force compresses the first vibration isolator and uncompresses the second vibration isolator, and such that the second downward force compresses both the first vibration isolator and the second vibration isolator. In some embodiments, adjusting the first downward force based on the second downward force places at least one of the first vibration isolator or the second vibration isolator in a quasi-zero-stiffness (QZS) range. In some embodiments, the compression fixture further includes: a motor configured to apply the first downward force; a sensor configured to measure the second downward force; and a controller configured to adjust the first downward force based on the second downward force. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the vibration isolator pre-load mechanism, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
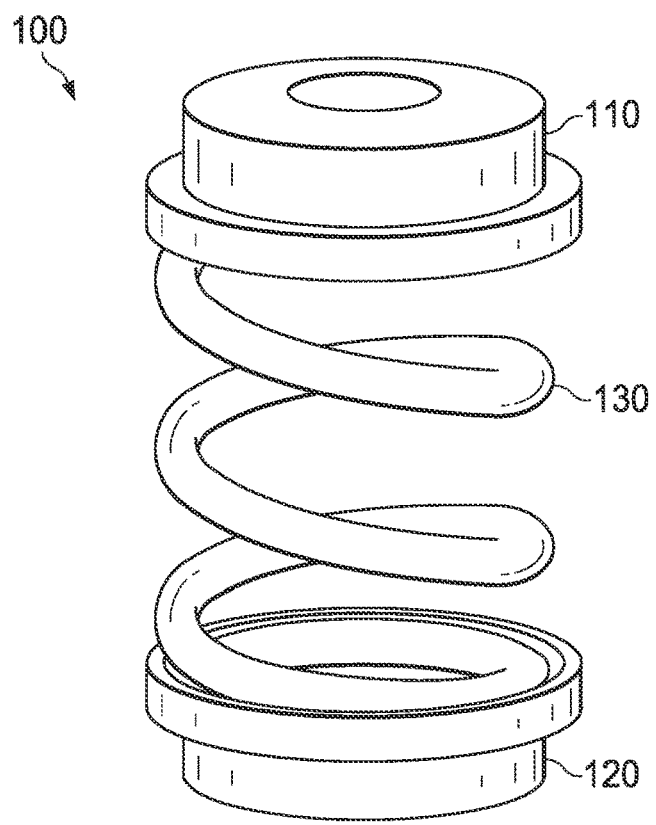
FIG. 1 is an exemplary representation of a conventional linear spring isolator, according to aspects of the present disclosure.

To reduce vibration transmission any given axis, a stacked disk isolator or quasi-zero-stiffness (QZS) isolator may be employed, which consists of a stack of flexible Belleville washers or disk spring washers arranged in stacks of alternating cones, separated by ring-shaped spacers positioned at the inner and outer edges of the washers. By suitable selection of spring design parameters, such a spring stack may be designed to produce a quasi-zero/negative stiffness response to a range of forces applied to the spring stack (i.e., when subjected to a force in this design range of forces, the spring stack may be deflected over a relatively wide range of values responsive to little or no increase in the applied force). Under these conditions, it has been found that transmission of vibrations from a first element (such as a vehicle floor) to a second element (such as a vehicle seat) may be eliminated or substantially attenuated.

In some cases, it may be desirable to apply an axial pre-load force on the spring stack of a QZS vibration isolator, sufficient for the stack to reach the quasi-zero/negative stiffness response range when a measured or expected weight is placed on the QZS isolator (e.g., from a passenger sitting in a vehicle seat, or cargo being placed on the seat), so that the full benefit of the isolator can be realized. Disclosed is a vibration isolator pre-load mechanism that maintains a pre-load force on the QZS vibration isolator. In some cases this may be a fixed pre-load force, or a force that is adjustable by manual or mechanical intervention such as moving a bolt or pin. In other embodiments, the pre-load force may be automatically adjusted depending on the amount of weight placed on the QZS vibration isolator (e.g., by a passenger sitting down on a vehicle seat).

A range of forces to be applied to the spring stack may be estimated (for example, a weight range of people that may sit in a vehicle seat supported by the spring stack). A fixture is provided for pre-compressing the spring stack based on the estimated range of applied forces. The fixture may be adjusted to compress to apply a pre-load force to the stack to bring an initial applied force to a level close to the range required for the quasi-zero/negative stiffness response. The stack may be pre-compressed such that an additional applied force (for example, due to a weight of a vehicle seat occupant) at a lower end of the range of estimated forces will bring the total applied force to at least the minimum force value required to produce the quasi-zero/negative stiffness response.

In an automated version of the vibration isolator pre-load mechanism, a user may sit in a vehicle seat supported by the spring stack. The user's weight may be determined by a weight sensor. Operation of the vibration isolator pre-load mechanism may be controlled by a motor and gear system of other motion control mechanism. A controller may control operation of the fixture to compress the spring stack according to the detected weight of the user, to bring the total force applied to the spring stack to within the range required for the quasi-zero/negative stiffness response.

The proposed arrangement enables a single design of spring stack to be adapted to provide a quasi-zero/negative stiffness response for a wide range of applied forces, and will for example help improve the comfort of vehicle seats by reducing vibration transmitted upward into the seat from the vehicle floor. This design provides an improvement over existing vehicle seats because it permits a quasi-zero-stiffness response from the vibration isolators across a broad range of applied weights. The result is less transmission of vibration between the vehicle floor and the vehicle seat, and thus a smoother ride for passengers.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the vibration isolator pre-load mechanism. Certain features may be added, removed, or modified without departing from the spirit of the claimed subject matter.

FIG. 1 is an exemplary representation of a conventional linear spring isolator 100, according to aspects of the present disclosure. The linear spring isolator 100 includes a top attachment portion 110 and bottom attachment portion 120, separated by a spring 130. The spring 130 may for example be a metallic spring which deflects (e.g., compresses or stretches) in a manner that is approximately linearly correlated to the amount of vertical force placed on the isolator 100. In an example, the linear spring isolator 100 may be placed between a vehicle seat and the vehicle floor, in an attempt to limit transmission of vibrations from the floor to the seat. In such a use case, the top attachment portion 110 may for example be bolted to the seat frame, while the bottom attachment portion 120 may for example be bolted to the vehicle floor, or to the top of a slide rail to which the seat is mounted. Such undamped linear spring isolators 100 provide limited vibration isolation and limited lateral stability and lateral load capacity.

Figure 2A:
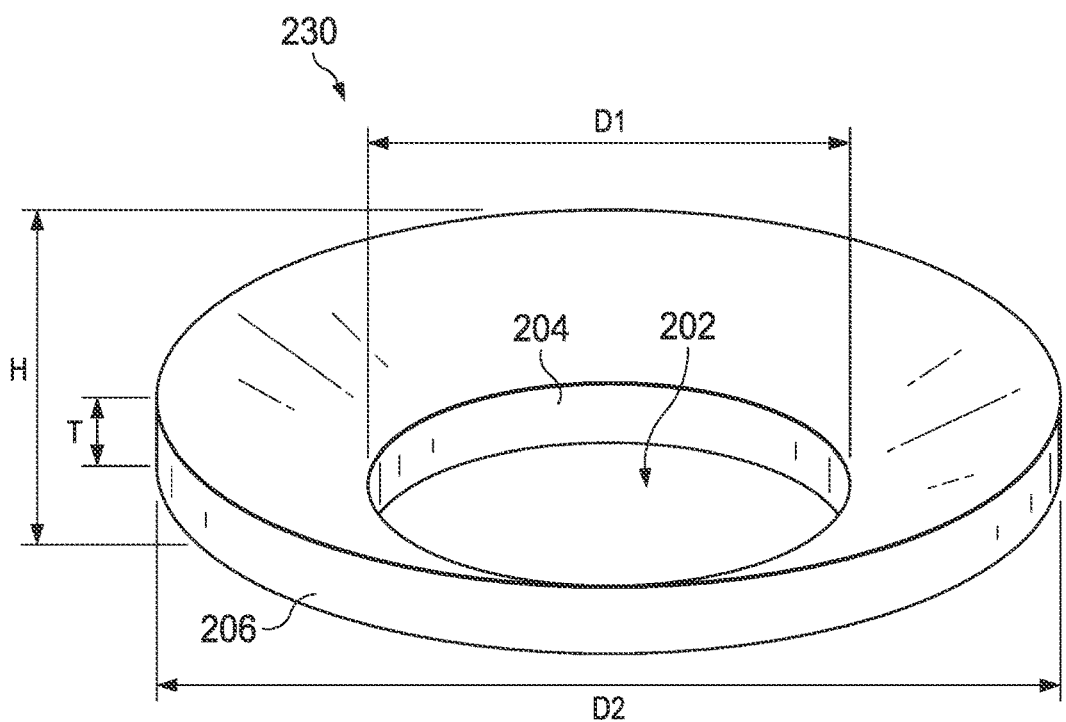
FIG. 2A is a perspective view of a ring-shaped or cone-shaped disk, Belleville washer, or disk spring washer, in accordance with aspects of the present disclosure.

FIG. 2A is a perspective view of a ring-shaped or cone-shaped disk 230, in also known as a Belleville washer or disk spring washer, in accordance with aspects of the present disclosure. The disk 230 may for example be made of rubber, or another elastic material capable of flexing and then returning to its original shape. The conical shape of the disk is formed because the inner edge 204 and the outer edge 206 of the disk 230 are separated vertically by a height H. The inner edge 204 forms a central opening 202 with a diameter D1, while the outer edge 206 of the disk 230 has a diameter D2. The material forming the spring disk or washer 230 has a thickness T.

Figure 2B:
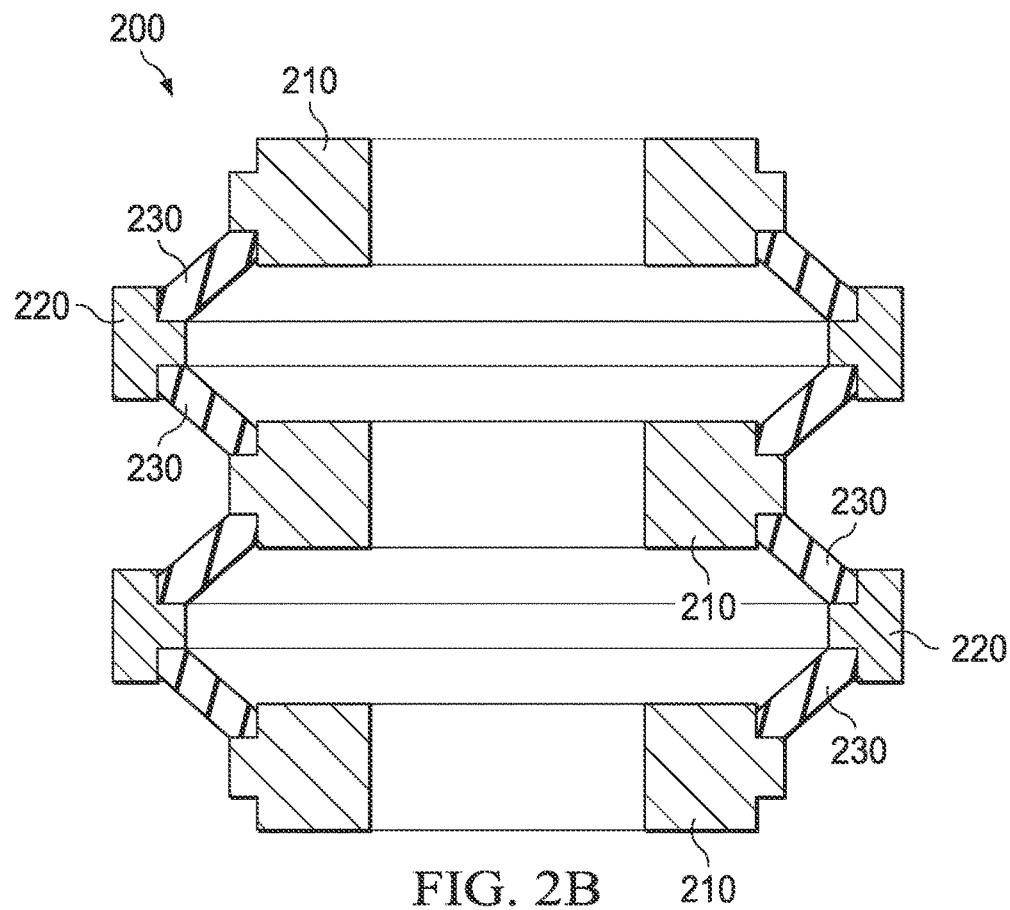
FIG. 2B is a side cross-sectional view of an exemplary quasi-zero-stability (QZS) vibration isolator, in accordance with aspects of the present disclosure.

FIG. 2B is a side cross-sectional view of an exemplary quasi-zero-stiffness (QZS) vibration isolator 200, in accordance with aspects of the present disclosure. The QZS isolator 200 includes a plurality of ring-shaped or cone-shaped rubber disks 230, also known as Belleville washers, disk spring washers, or spring disk washers. The disks 230 are separated by inner spacers 210 coupled to the inner edge of each spring disk washer 230 or each pair of spring disk washers 230. The spring disk washers 230 are also separated by outer spacers 220 coupled to the outer edge of each spring disk washer 230. The disks or Belleville washers 230 are stacked such that if two disks 230 are vertically adjacent to one another, then either their two outer edges 206 (See FIG.

1A) are coupled to the same outer spacer 220, or their inner edges 204 (See FIG. 1A) are coupled to the same inner spacer 210. Thus, the stack of disks or washers 230 forms a bellows shape that is capable of compressing vertically and then returning to its original shape.

The QZS vibration isolator 200 may include either an even or an odd number of spring disk washers 230. The spring disk washers 230 may be coupled to the spacers 210 and 220 by means of a friction fit or adhesive coupling, either or both of which may involve grooves, slots, or indentations in either the spacers 210, 220 or the spring disk washers 230, or any combination thereof.

Figure 2C:
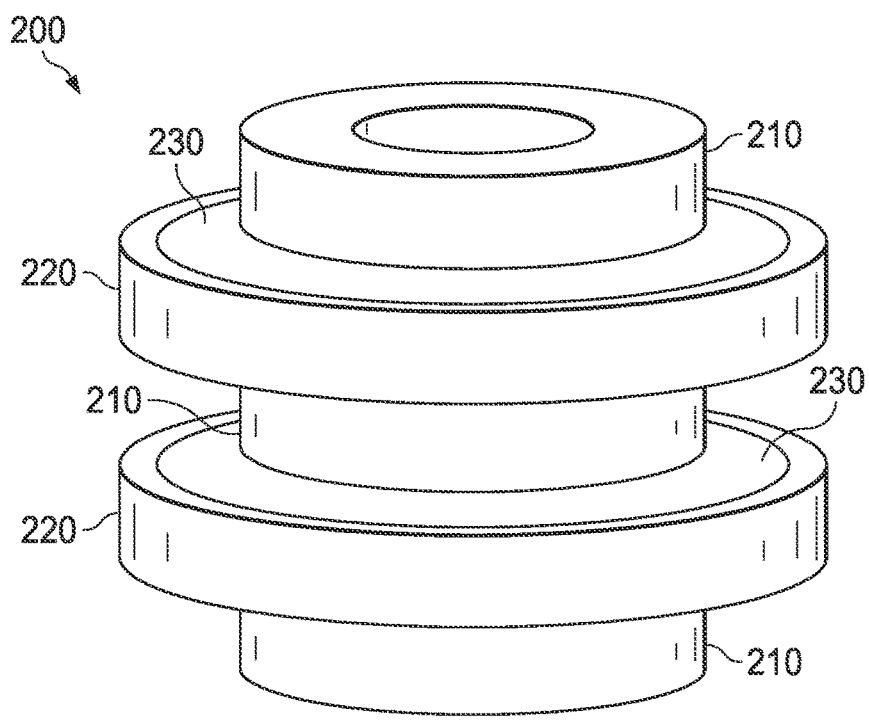
FIG. 2C is a perspective view of an exemplary quasi-zero-stability (QZS) vibration isolator, in accordance with aspects of the present disclosure.

FIG. 2C is a perspective view of an exemplary QZS vibration isolator 200, in accordance with aspects of the present disclosure. Visible are the inner spacers 210, outer spacers 220, and disk spring washers 230.

Figure 3:
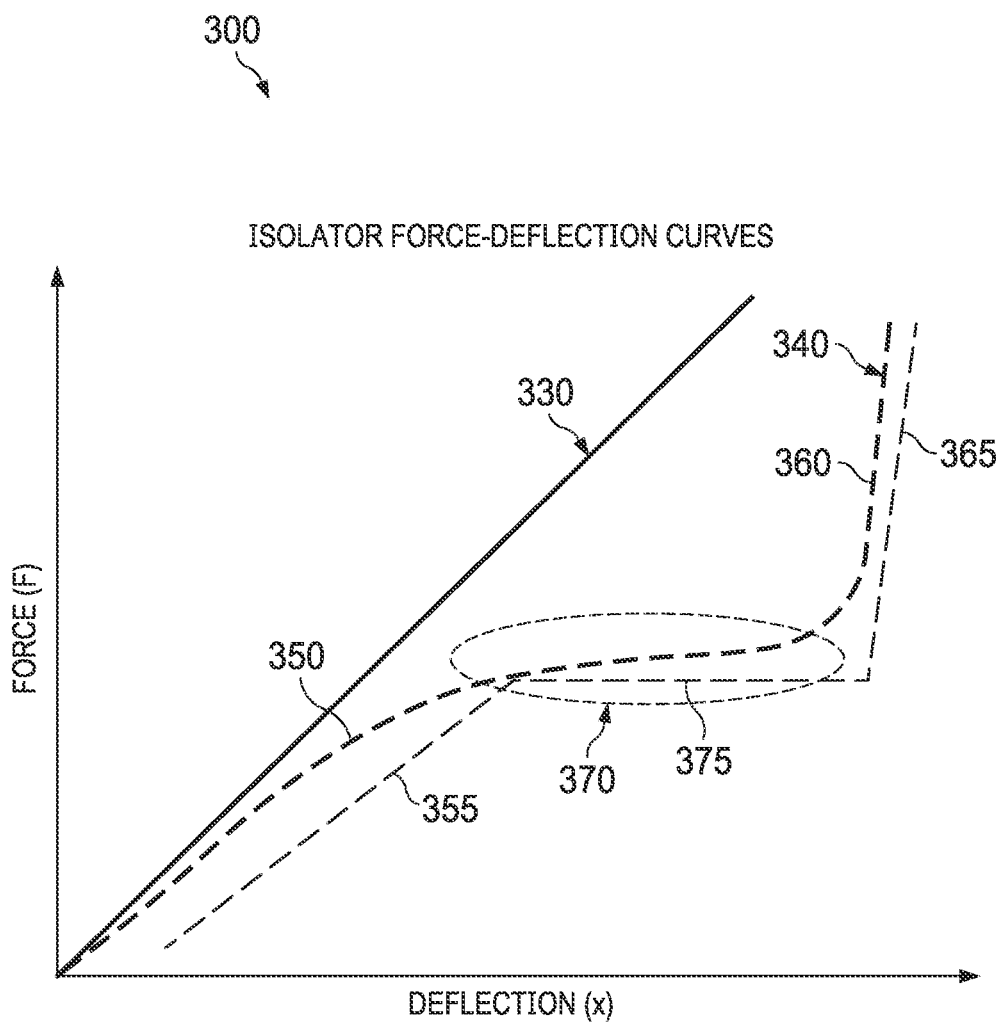
FIG. 3 shows a performance graph of an example linear spring isolator and an example QZS isolator, in accordance with aspects of the present disclosure.

FIG. 3 shows a performance graph 300 of an example linear spring isolator 330 and an example QZS isolator 340, in accordance with aspects of the present disclosure. The linear spring isolator curve 330 exhibits a linear or approximately linear relationship between an applied force F and a resulting deflection x of the spring. The slope of this line is the spring constant k of the spring, such that F=kx. The QZS isolator curve 340 exhibits a more complex relationship between the vertical force F placed on it and the resulting vertical deflection or compression x. This force-deflection relationship includes a first approximately linear region 350 and a second approximately linear region 360, separated by a quasi-zero-stiffness (QZS) region 370. Thus, the force-deflection relationship can be approximated as three straight line segments 355, 365, and 375.

Within the first approximately linear region 350, the slope of the curve 340 may be approximated as $F=k_1 x$, yielding the first line segment 355. For the QZS region, the slope can be approximated as zero, yielding the second line segment 375. For the second approximately linear region 360, the slope of the curve 340 Ny be approximated as $F=K_2 x$, yielding the third line segment 365.

In the quasi zero stiffness region 365 of the QZS isolator curve 340, small increases in downward force F on the QZS isolator result in disproportionately large increases in the deflection x or, alternatively, it can be said that large changes in the deflection x do not result in significant changes in the upward force F delivered by the isolator. As shown below, this force-deflection relationship 340 makes the QZS isolator more effective than the linear spring at damping or isolating vibrations.

Figure 4:
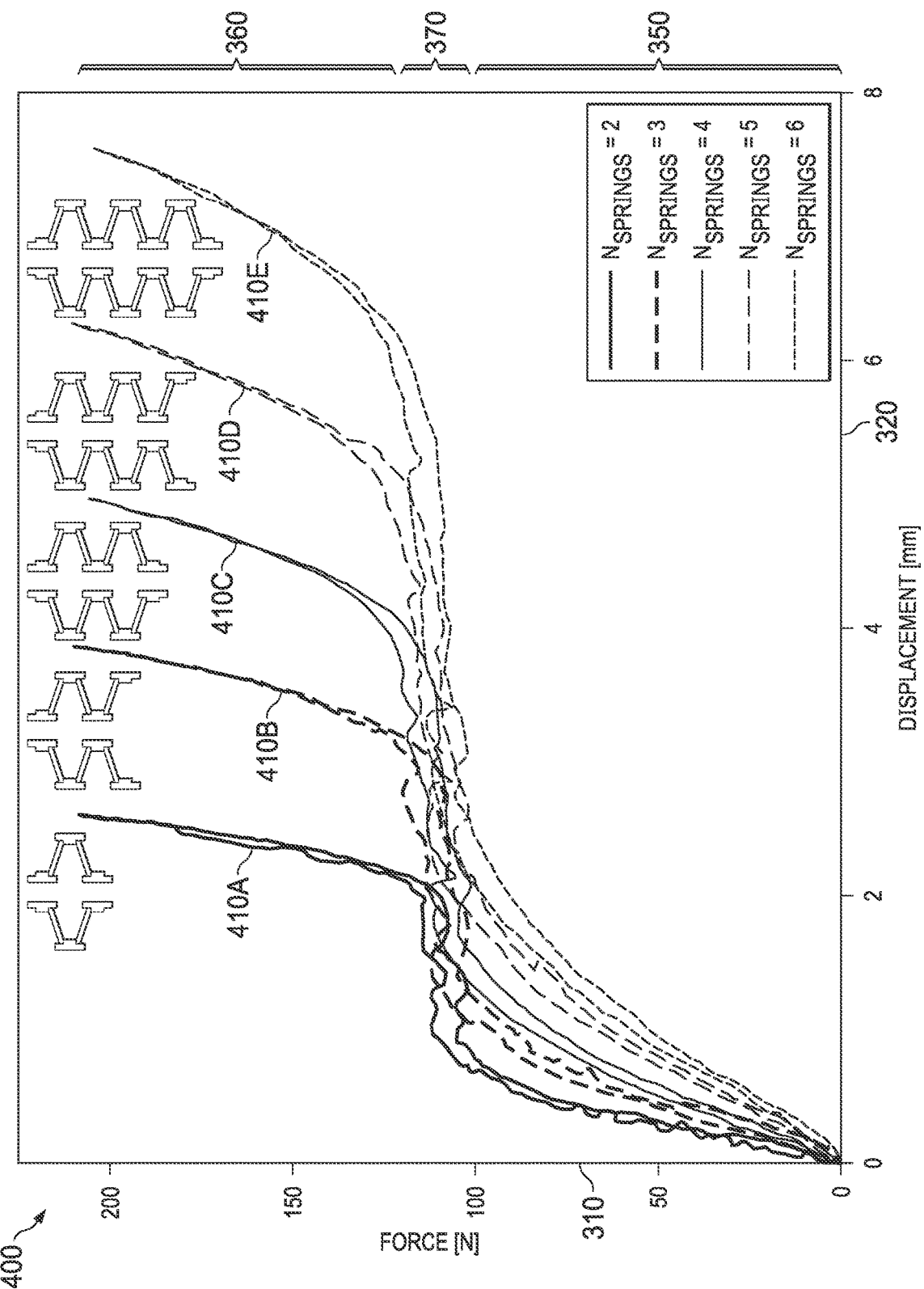
FIG. 4 is a performance graph showing the relationship between force and displacement for five different example QZS isolators, in accordance with aspects of the present disclosure.

FIG. 4 is a performance graph 400 showing the relationship between force 310 and displacement 320 for five different example QZS isolators: 410A (with two disk spring washers), 410B (with three disk spring washers), 410C (with four disk spring washers), 410D (with five disk spring washers), and 410E (with six disk spring washers), in accordance with aspects of the present disclosure. As shown in FIG. 3, the force-displacement curve for each QZS isolator includes a first approximately linear region 350, a quasi-zero-stiffness (QZS) region 370, and a second approximately linear region 360. As can be seen in the graph 400, the width or displacement range of the QZS region 370 (e.g. the number of millimeters of displacement permitted within the QZS region) increases with the number of disk spring washers, such that QZS isolator 410A, with two disk spring washers, has a QZS region approximately 1 mm wide, whereas QZS isolator 410E, with six disk spring washers, has a QZS region approximately 4 mm wide. Thus, QZS isolators with more disk spring washers are more capable of absorbing movement at the bottom of the isolator (e.g., movement of a vehicle floor) without transferring it to the top of the isolator (e.g., to the bottom of a vehicle seat). However, QZS isolators with more disk spring washers must be correspondingly taller, which may limit the places they will fit and the applications for which they may be used. Taller QZS isolators will also tend to cost more, as they require more materials, and they may exhibit less lateral stability and less lateral load capacity than shorter QZS isolators.

Figure 5A:
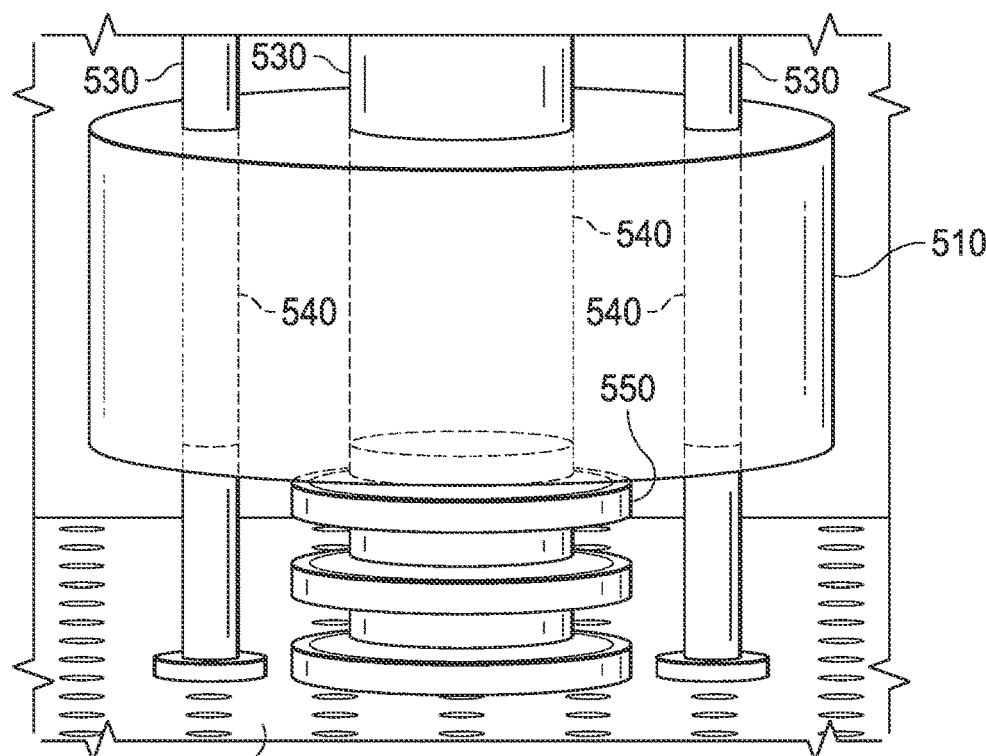
FIG. 5A is a perspective view of an example one-dimensional (1D) QZS vibration isolator measurement apparatus, in accordance with aspects of the present disclosure.

FIG. 5A is a perspective view of an example one-dimensional (1D) QZS vibration isolator measurement apparatus, in accordance with aspects of the present disclosure. Visible are a test mass 510 mounted to a shaker table 520 by a vibration isolator 550. For lateral and rotational stability during 1D vibration testing, the test mass 510 includes three tubular channels 540 through which three shafts 530 pass.

Figure 5B:
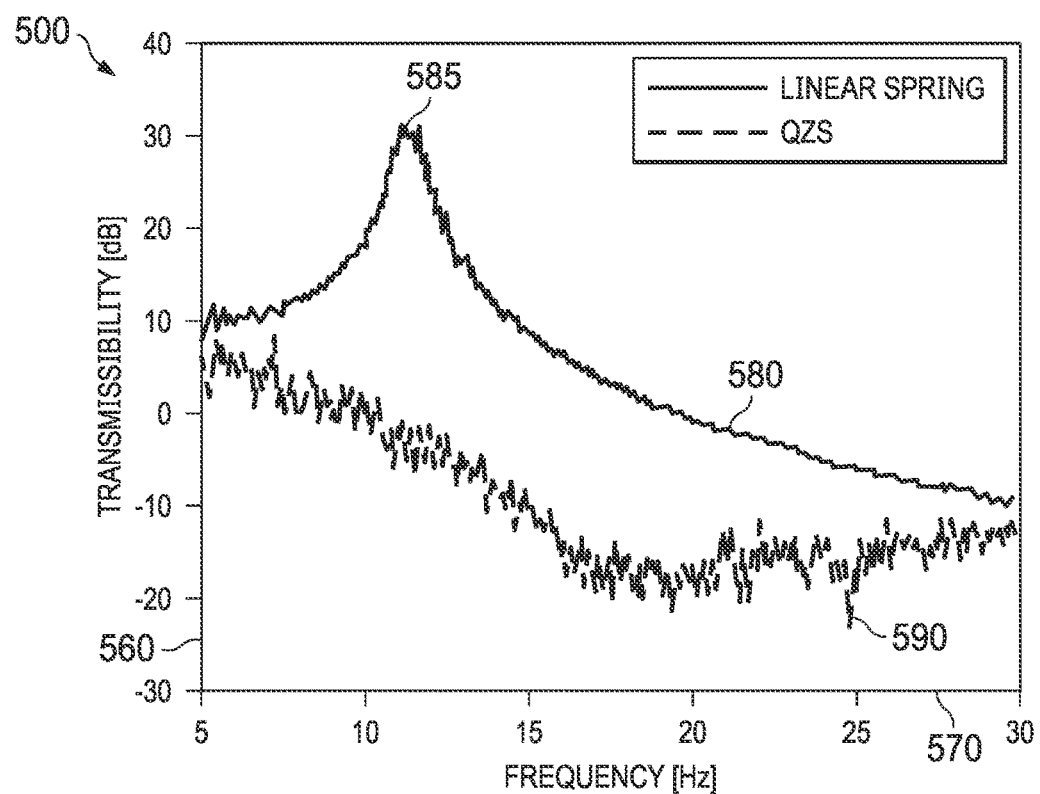
FIG. 5B is a performance graph showing the 1D vibration suppression performance of two different types of isolators, in accordance with aspects of the present disclosure.

FIG. 5B is a performance graph 500 showing the 1D vibration suppression performance of two different types of isolators in the test apparatus of FIG. 5A, in accordance with aspects of the present disclosure. The graph 500 shows curves of transmissibility 560 (measured for example in decibels or dB) vs. frequency 570 (measured for example in Hertz or Hz), for a linear spring isolator 580 and a QZS isolator 590. This represents, for example, the extent to which vertical vibrations of the shaker table 520 (See FIG. 5A) are translated into vertical vibrations of the test mass 510 (see FIG. 5A). A transmissibility of zero dB may represent perfect transmission of the vibrations through the isolator 550 (see FIG. 5A), such that a vibration of the shaker table causes an equal vibration of the test mass at that particular frequency. A transmissibility greater than 0 dB may represent amplification by the isolator, such that a vibration of the shaker table results in a larger or more powerful vibration of the test mass at that particular frequency. A transmissibility smaller than 0 dB may represent dampening of vibrations by the isolator, such that a vibration of the shaker table results in a smaller or less powerful vibration of the test mass at that particular frequency. In general, values less than 0 dB are desirable at all frequencies, and especially at higher frequencies.

As can be seen, the linear spring isolator curve 580 exhibits a sharp peak 585 at approximately 12 Hz, possibly representing a resonant frequency of the spring, and thus causing transmissibility in excess of +30 dB (e.g., 100 times more vibration than is observed at 5 Hz and 15 Hz). The linear spring isolator curve does not fall below 0 dB until the frequency of vibration exceeds 20 Hz. By contrast, the QZS isolator curve 590 does not exhibit any sharp peaks, and it drops below 0 dB at a vibration frequency of approximately 10 Hz, and remains below zero for the remainder of the curve. The QZS isolator curve 590 is also lower at all points than the linear spring isolator curve 580, indicating that the QZS isolator is better at suppressing vertical vibrations (or, alternatively, worse at transmitting such vibrations) than the linear spring isolator.

Figure 6A:
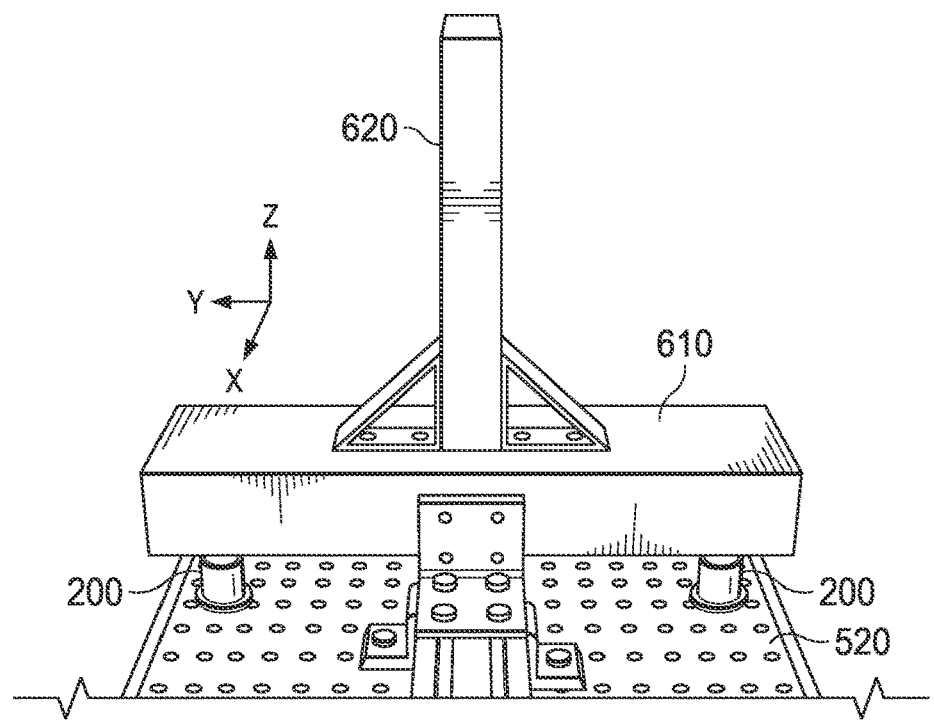
FIG. 6A is a perspective view of an example two-dimensional (2D) QZS vibration isolator measurement apparatus, in accordance with aspects of the present disclosure.

FIG. 6A is a perspective view of an example two-dimensional (2D) QZS vibration isolator measurement apparatus, in accordance with aspects of the present disclosure. Visible are a vertical test mass 620 fixedly mounted to a horizontal test mass 610, which in turn is mounted to a shaker table 520 by a pair of QZS vibration isolators 200. The effectiveness of the QZS isolators 200 may be assessed for example by measuring the vibration at the top of the vertical test mass 620, and comparing it to vibrations measured at the surface of the shaker table 520. Vibration of the shaker table 520 can result in rocking of the test masses 610 and 620, resulting in torques and lateral forces on the QZS isolators.

Figure 6B:
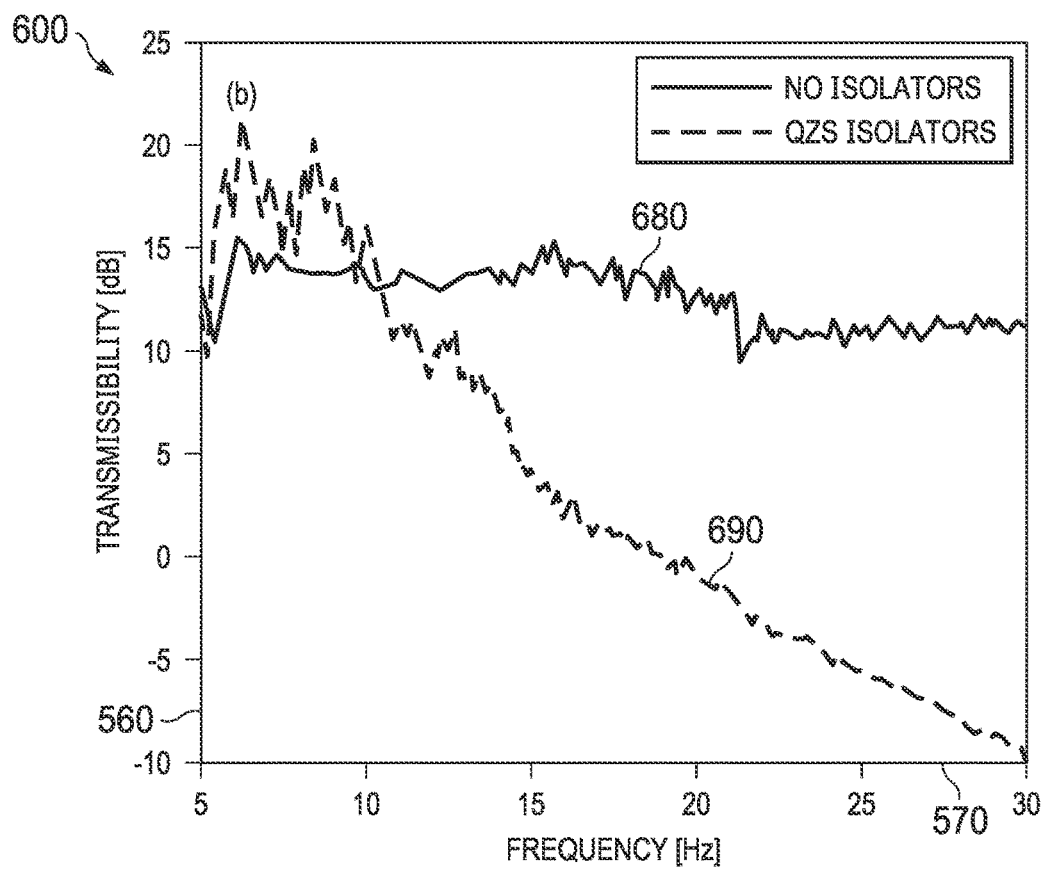
FIG. 6B is a performance graph showing the vibration suppression performance a QZS isolator, in accordance with aspects of the present disclosure.

FIG. 6B is a performance graph 600 showing the vibration suppression performance the QZS isolators in the test apparatus of FIG. 6A, in accordance with aspects of the present disclosure. The graph 600 shows curves of transmissibility 560 (measured for example in decibels or dB) vs. frequency 570 (measured for example in Hertz or Hz), for a non-isolated mass 680 and a QZS isolated mass 690. This represents, for example, the extent to which vertical vibrations of the shaker table 520 (See FIG. 6A) are translated into vertical and horizontal vibrations of the top of the vertical test mass 620 (see FIG. 6A), e.g. through lateral rocking of the lower test mass due to uneven compression of the QZS isolators 200. A transmissibility of zero dB may represent perfect transmission of the vibrations through the QZS isolators 200 (see FIG. 6A), such that a vibration of the shaker table causes an equal vibration of the top of the vertical mass at that particular frequency. A transmissibility greater than 0 dB may represent amplification by the isolators and/or the test masses, such that a vibration of the shaker table results in a larger or more powerful vibration of the top of the vertical test mass at that particular frequency. A transmissibility smaller than 0 dB may represent dampening of vibrations by the isolators, such that a vibration of the shaker table results in a smaller or less powerful vibration of the top of the vertical test mass at that particular frequency. In general, values less than 0 dB are desirable at all frequencies, and especially at higher frequencies.

As can be seen, when the test masses are mounted directly to the shaker table with no vibration isolation, as represented by curve 680, the test masses amplify the vibrations of the shaker table by 10-15 dB across all measured frequencies. The QZS-isolated curve 690 shows an even greater amplification of 15-20 dB between 5 Hz and 10 Hz. However, the amplification is less than that of curve 680 at all measured frequencies above 10 Hz, and is less than zero (indicating a net damping of vibrations) at all measured frequencies higher than 20 Hz. This demonstrates that QZS isolators are effective at reducing vibrations of a 2D shaking apparatus.

It is noted that 2D vibrations can induce lateral forces on the seat.

Figure 7:
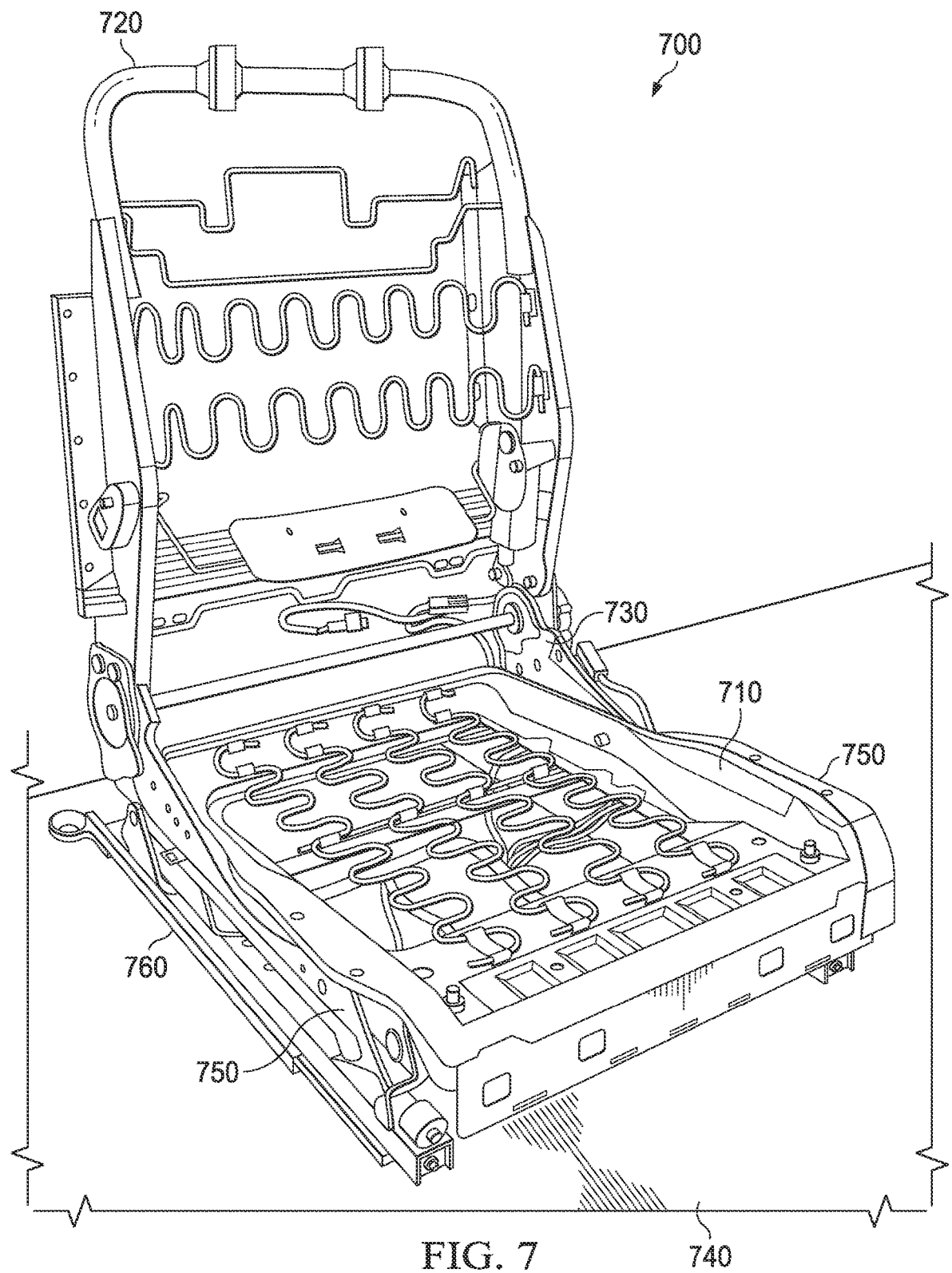
FIG. 7 is a perspective view of a vehicle seat with its wiring, cushioning, and upholstery removed, in accordance with aspects of the present disclosure.

FIG. 7 is a perspective view of a vehicle seat 700 with its wiring, cushioning, and upholstery removed, in accordance with aspects of the present disclosure. The vehicle seat 700 includes a seat pan or seat cushion pan 710, a seat back or seat back frame 720, and a recliner apparatus 730 to adjust the angle between the seat pan 710 and the seat back 720. The seat 700 also includes a seat frame 750, which attaches to the vehicle floor 740 by means of two slide rails 760, which permit the seat 700 to slide backward and forward with respect to the floor 740.

Figure 8A:
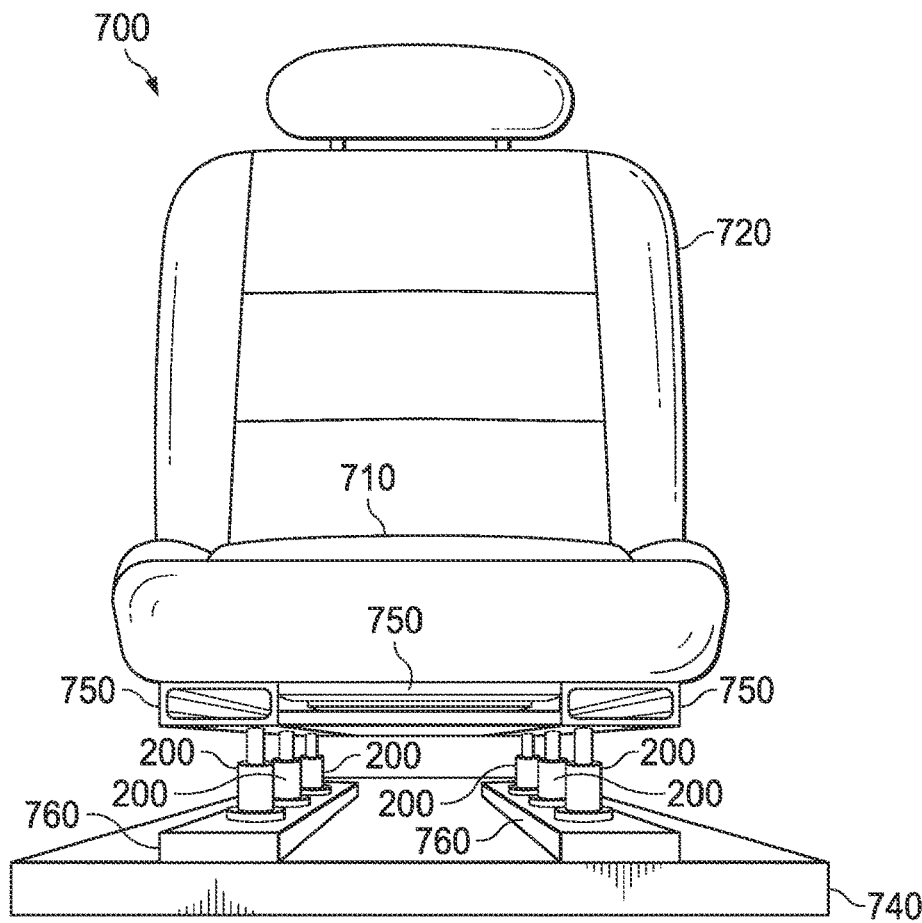
FIG. 8A is a perspective view of a vehicle seat, in accordance with aspects of the present disclosure.

FIG. 8A is a perspective view of a vehicle seat 700, in accordance with aspects of the present disclosure. The vehicle seat 700 includes a seat back 720 coupled to a seat pan 710, which is coupled to the seat frame 750. The seat frame 750 is coupled to a plurality of QZS vibration isolators 200, which are in turn coupled to the slide rails 760, which are coupled to the vehicle floor. Coupling may for example be through welds, bolts, screws, rivets, solder, adhesive, or other means known in the art. The QZS isolators 200 are configured to reduce transmission of vibration between the vehicle floor 740 and the seat 700.

Figure 8B:
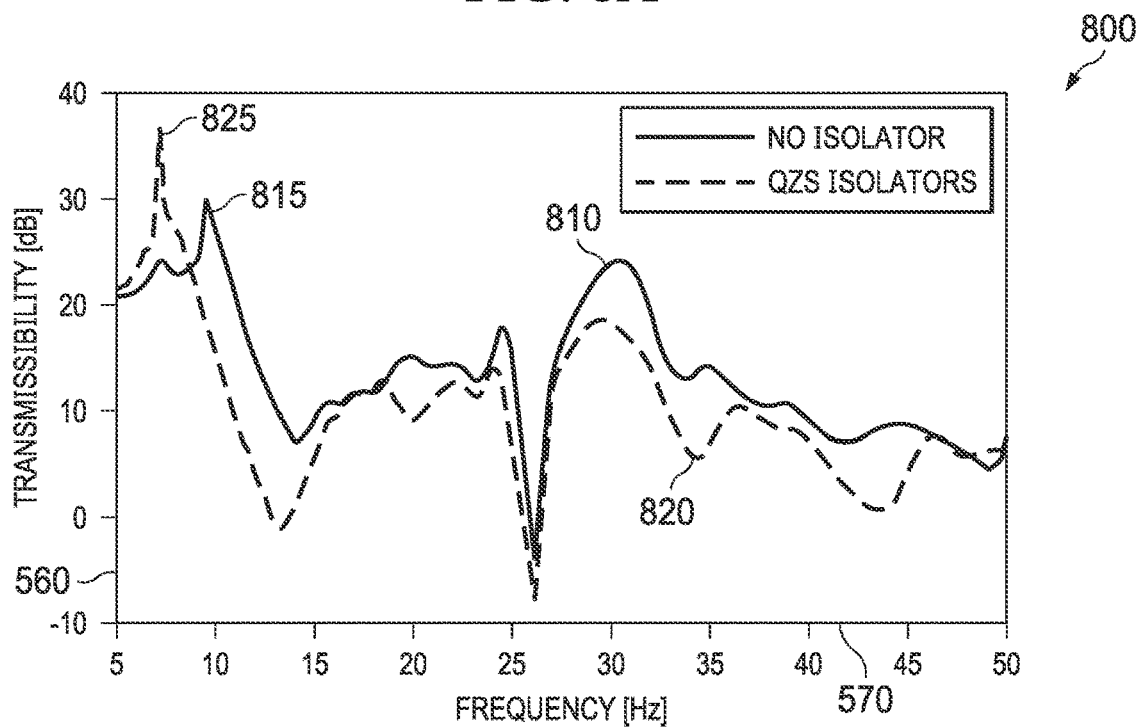
FIG. 8B is a performance graph showing the vibration suppression performance QZS isolators, in accordance with aspects of the present disclosure.

FIG. 8B is a performance graph 800 showing the vibration suppression performance of the QZS isolators 200 of FIG. 8A, in accordance with aspects of the present disclosure. The graph 800 shows curves of transmissibility 560 (measured for example in decibels or dB) vs. frequency 570 (measured for example in Hertz or Hz), for a non-isolated seat 810 and a QZS-isolated seat 820. This represents, for example, the extent to which vibrations of the floor 740 (see FIG. 8A) are translated into vibrations of the top of the seat back 720 (see FIG. 8A), e.g. through lateral rocking of the lower test mass due to uneven compression of the QZS isolators 200 (see FIG. 8A). A transmissibility of zero dB may represent perfect transmission of the vibrations through the QZS isolators 200 (see FIG. 6A), such that a vibration of the floor causes an equal vibration of the top of the seat back at that particular frequency. A transmissibility greater than 0 dB may represent amplification by the seat structure and/or the isolators, such that a vibration of the floor results in a larger or more powerful vibration of the top of the seat at that particular frequency. A transmissibility smaller than 0 dB may represent dampening of vibrations by the isolators, such that a vibration of the floor results in a smaller or less powerful vibration of the top of the seat back at that particular frequency. In general, values less than 0 dB are desirable at all frequencies, and especially at higher frequencies.

As can be seen, both the QZS-isolated curve 820 and the non-isolated curve 810 exhibit amplification spikes at low frequency. The spike 815 of the non-isolated curve 810 occurs at 10 Hz and has a maximum value of approximately 30 dB. The spike 825 of the QZS-isolated curve 820 is actually larger than the spike 815 of curve 810, indicating greater amplification of the floor's vibrations, with a peak value of roughly 37 dB. However, this spike occurs at a lower frequency—7 Hz for spike 825 vs. 10 Hz for spike 815, and may therefore result in less overall discomfort to a user sitting in the seat. Notably, the QZS-isolated curve 820 is lower than the non-isolated curve 810 at most measured frequencies between 9 Hz and 47 Hz, by as much as 10 dB (e.g., one tenth as much vibration transmission). The QZS-isolated curve 820 is approximately equal to the non-isolated curve 810 at 17 Hz and at 47-50 Hz. The total area under curve 820 is significantly less than the total area under curve 810, indicating less overall vibration transmissibility between the vehicle floor and the top of the seat back. Thus, a person of ordinary skill in the art will appreciate that QZS isolators may be effective at reducing the vibrations of a vehicle seat, and will generally result in a more comfortable ride for an occupant of the seat.

It is noted that vibrations of the vehicle floor and/or vehicle seat can induce lateral forces on the seat.

Figure 9:
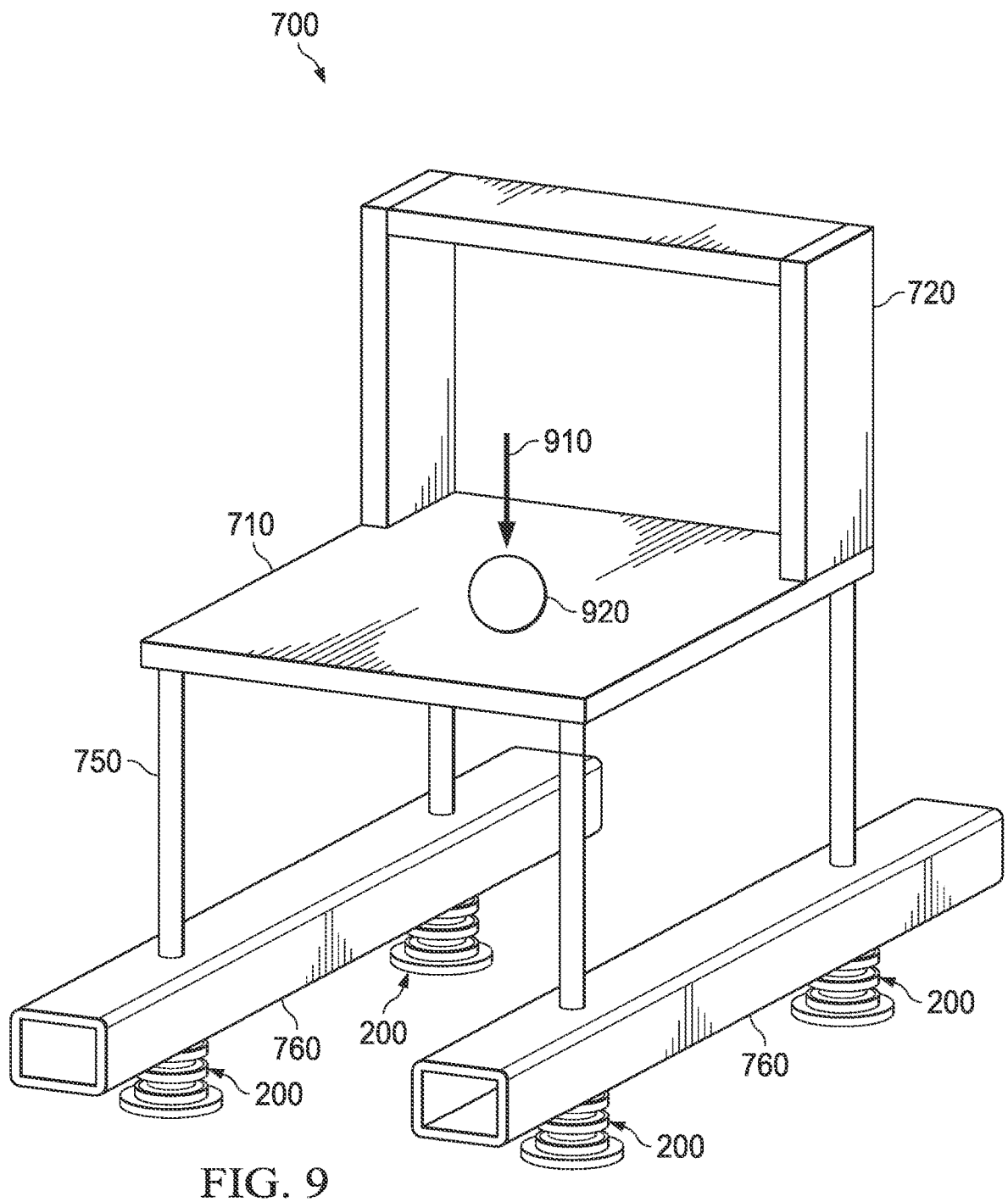
FIG. 9 is a perspective view of a vehicle seat incorporating QZS vibration isolators, in accordance with aspects of the present disclosure.

FIG. 9 is a perspective view of a vehicle seat incorporating QZS vibration isolators, in accordance with aspects of the present disclosure. Visible are the seat pan 710, seat back 720, and seat frame 750. In the non-limiting example shown in FIG. 9, QZS vibration isolators or spring stacks 200 are located between the seat frame 750 and the sliding rails 760. As a result of normal loading (e.g., a seated mass 920 such as a passenger or cargo placed in the vehicle seat 700), the seat experiences a vertical force 910 in a downward direction, which is then transferred to the QZS isolators or spring stacks 200. Ideally, this vertical force 910 will place the QZS isolators 200 near the center of the quasi-zero-stiffness (QZS) range of their force-deflection curves, as this will result in the lowest overall transmission of vibration between the seat rails 760 and the seat frame 750. However, in many cases, the vertical force 910 will be insufficient to reach the QZS range (e.g., because the seated mass 920 is too light), and in other cases the vertical force will be excessive (e.g., because the seated mass 920 is too heavy), and will compress the QZS isolators beyond their QZS region. It is therefore desirable to provide a mechanism for pre-loading or pre-unloading the QZS isolators 200 such that an expected load 910, or actual measured load 910, places the QZS isolators 200 near the center of the QZS region of their force-deflection curves.

Although a total of four springs stacks or QZS vibration isolators 200 are shown in FIG. 9, a person of ordinary skill in the art will appreciate that seat 700 may be isolated from vibration by other arrangements and other numbers of spring stacks or QZS isolators 200, including one, two, three, five, six or more spring stacks or QZS isolators 200.

Figure 10:
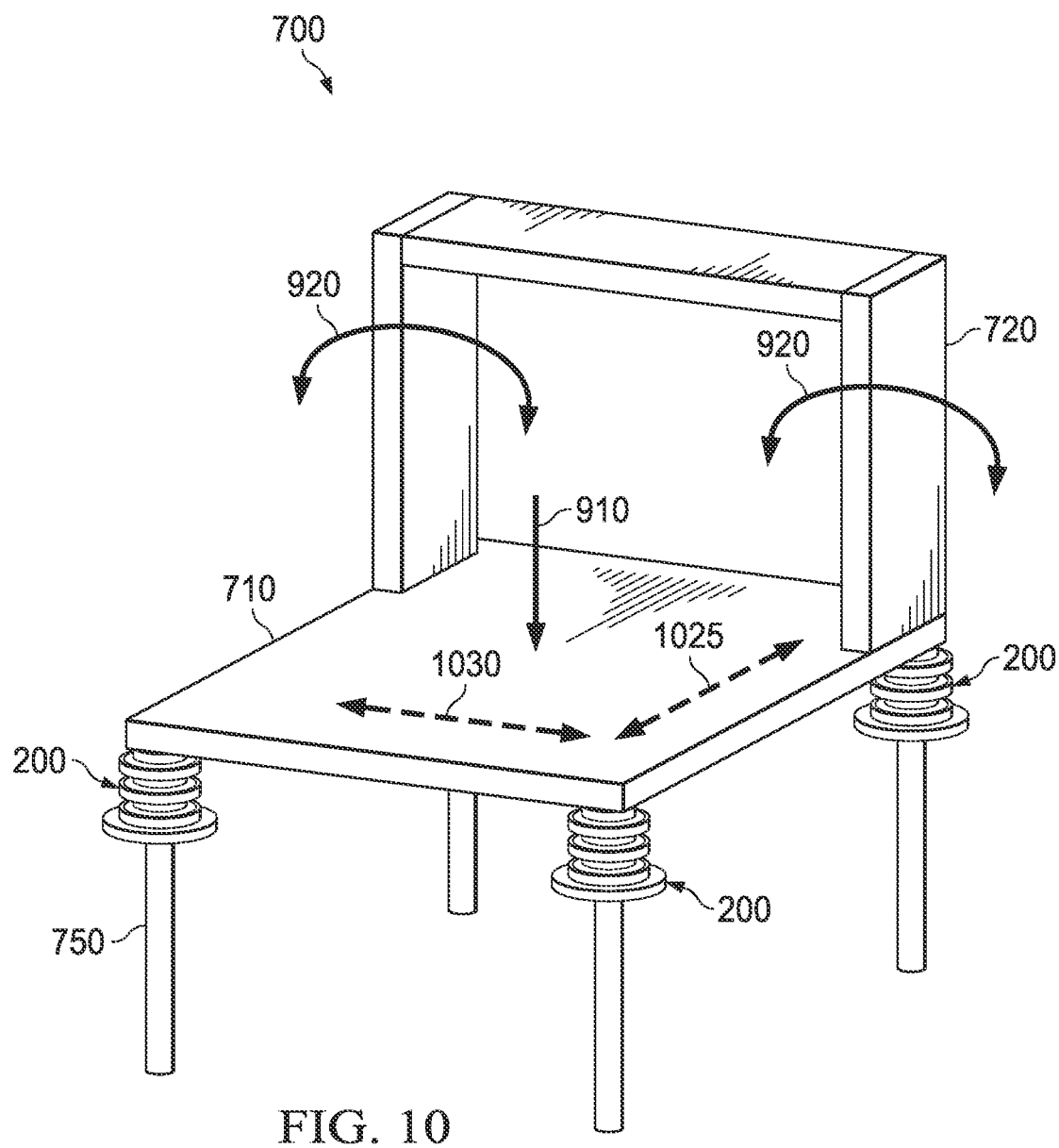
FIG. 10 is a perspective view of a vehicle seat incorporating QZS vibration isolators, in accordance with aspects of the present disclosure.

FIG. 10 is a perspective view of a vehicle seat 700 incorporating QZS vibration isolators, in accordance with aspects of the present disclosure. Visible are the seat pan 710, seat back 720, and seat frame 750. As a result of vibration, the seat 700 also experiences lateral forces 1030 and longitudinal forces 1025, which may cause rocking of the seat 700, resulting in torque forces 920.

In the non-limiting example shown in FIG. 10, QZS vibration isolators or spring stacks 200 are located between the seat frame 750 and the seat pan 710. As a result of normal loading, the seat experiences a vertical force 910 in a downward direction, which is then transferred to the QZS isolators or spring stacks 200. Ideally, this vertical force 910 will place the QZS isolators 200 near the center of the quasi-zero-stability (QZS) range of their force-deflection curves, as this may result in the lowest overall transmission of vibration between the seat rails 760 and the seat frame 750. However, in many cases, the vertical force 910 will be insufficient to reach the QZS range (e.g., because the seated mass 920 is too light), and in other cases the vertical force will be excessive (e.g., because the seated mass 920 is too heavy), and will compress the QZS isolators beyond their QZS region. It is therefore desirable to provide a mechanism for pre-loading or pre-unloading the QZS isolators 200 such that an expected load 910, or actual measured load 910, places the QZS isolators 200 near the center of the QZS region of their force-deflection curves.

Figure 11:
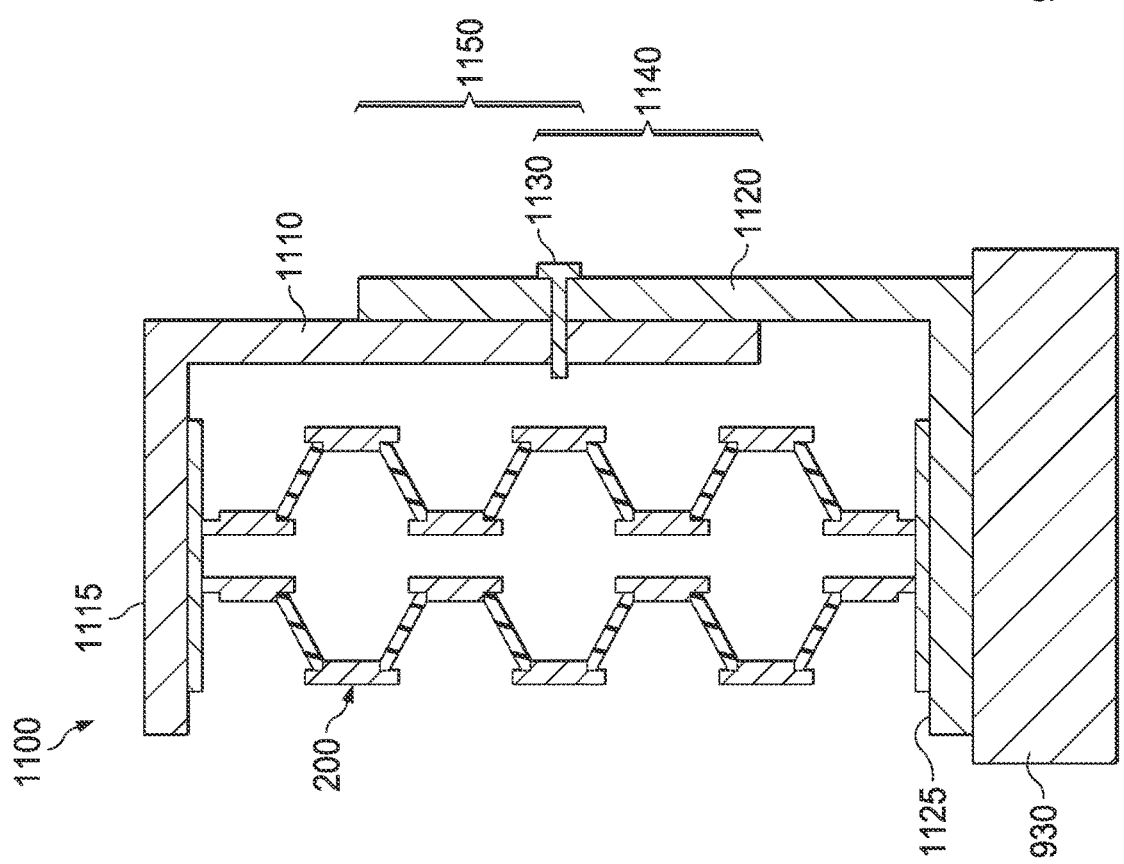
FIG. 11 is a side cross-sectional view of a vibration isolator pre-load mechanism, in accordance with at least one embodiment of the present disclosure.

FIG. 11 is a side cross-sectional view of a vibration isolator pre-load mechanism 1100, in accordance with at least one embodiment of the present disclosure. The vibration isolator pre-load mechanism 1100 includes a spring stack or QZS vibration isolator 200, as shown for example in FIGS. 2B and 2C. The QZS vibration isolator rests on a base plate or base spacer 930, which may serve as an attachment point, and is partially enclosed by a top enclosure 1110 and a bottom enclosure 1120. The top enclosure 1110 includes a top compressive surface 1115 that is in contact with the spring stack or QZS vibration isolator 200, and is capable of compressing the spring stack or QZS isolator 200 if moved downward, or uncompressing it if moved upward. The bottom enclosure 1120 includes a bottom compressive surface 1125 that is in contact with the spring stack or QZS vibration isolator 200, and is capable of compressing the spring stack or QZS isolator 200 if moved upward, or uncompressing it if moved downward. In the non-limiting example of FIG. 11, the relative positions of 1110 and 1120 are fixed by a bolt or pin 1130 that penetrates both a positioning track 1140 in the bottom enclosure 1120 and a positioning track 1150 in the top enclosure 1110. The positioning tracks 1140 and 1150 may for example each consist of a plurality of threaded holes at different vertical positions, or may each consist of vertical slots, or any combination thereof. The bolt or pin 1130 may in some cases be fixed in place by threads in the positioning tracks 1140 and 1150, or by a nut (e.g., a wing nut or lock nut), or by other means known in the art. When the bolt or pin 1130 is fixed in place, the relative positions of the top enclosure 1110 and bottom enclosure 1120 are also fixed.

Figure 12:
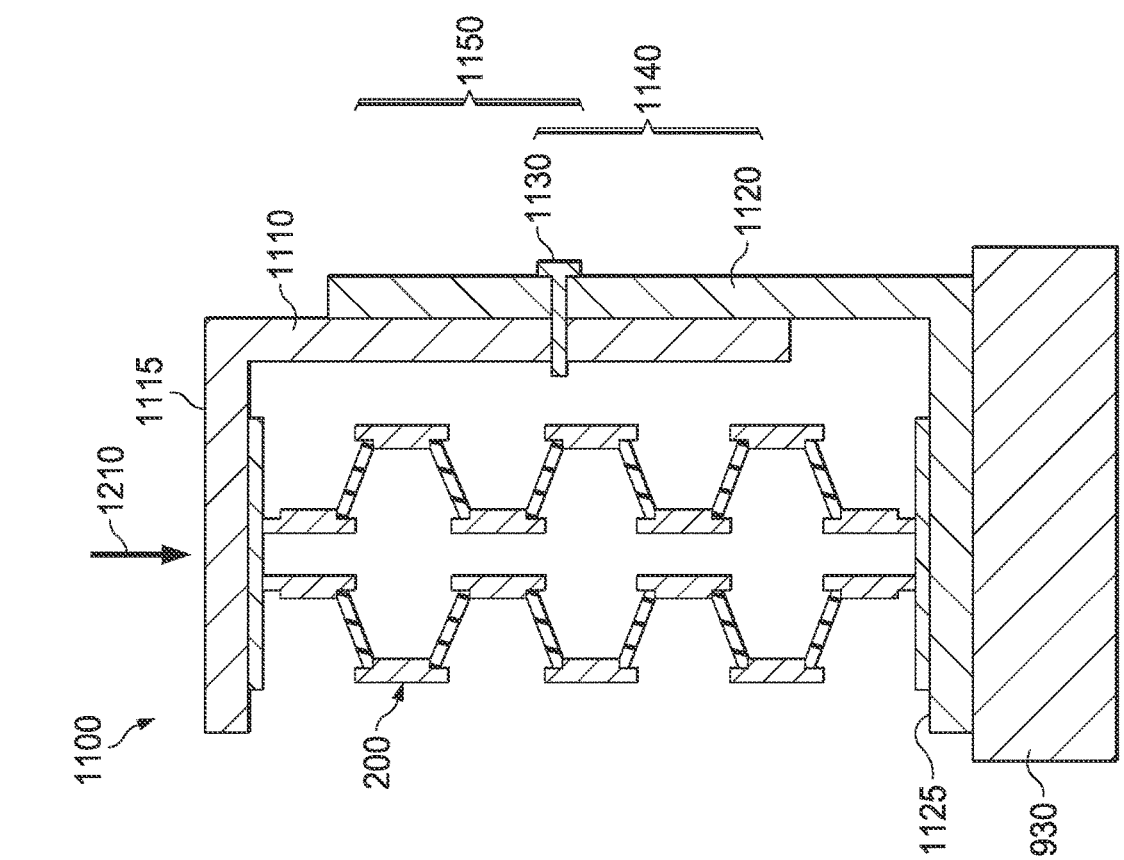
FIG. 12 is a side cross-sectional view of the vibration isolator pre-load mechanism of FIG. 11 in a pre-loaded state, in accordance with at least one embodiment of the present disclosure.

FIG. 12 is a side cross-sectional view of the vibration isolator pre-load mechanism 1100 of FIG. 11 in a pre-loaded state, in accordance with at least one embodiment of the present disclosure. When a downward pre-load force 1210 is applied to the top compressive surface 1115, while the bottom compressive surface 1120 is braced against or fixedly attached to a surface such as the base plate or base spacer 930, the spring stack or QZS vibration isolator is compressed, and the relative positions of the top enclosure 1110 and the bottom enclosure 1120 change accordingly. When the bolt or pin 1130 is then engaged through the positioning tracks 1140 and 1150 and fixed in position (e.g., with holes or threads in the engagement tracks 1140 and 1150, with a nut, or by other means), the top enclosure 1110 and bottom enclosure 1120 become fixed in these positions, and a compressive force equal to the preload force 1210 is exerted on the spring stack or QZS isolator 200 by the top compressive surface 1115 and bottom compressive surface 1125, even when the external preload force 1210 itself is removed. In some embodiments, this preload force may be selected to place the spring stack or QZS isolator 200 in the QZS range of its force-deflection curve when a known or expected weight presses down on the vibration isolator pre-load mechanism 1100 (e.g., from a passenger or cargo occupying a vehicle seat).

Figure 13:
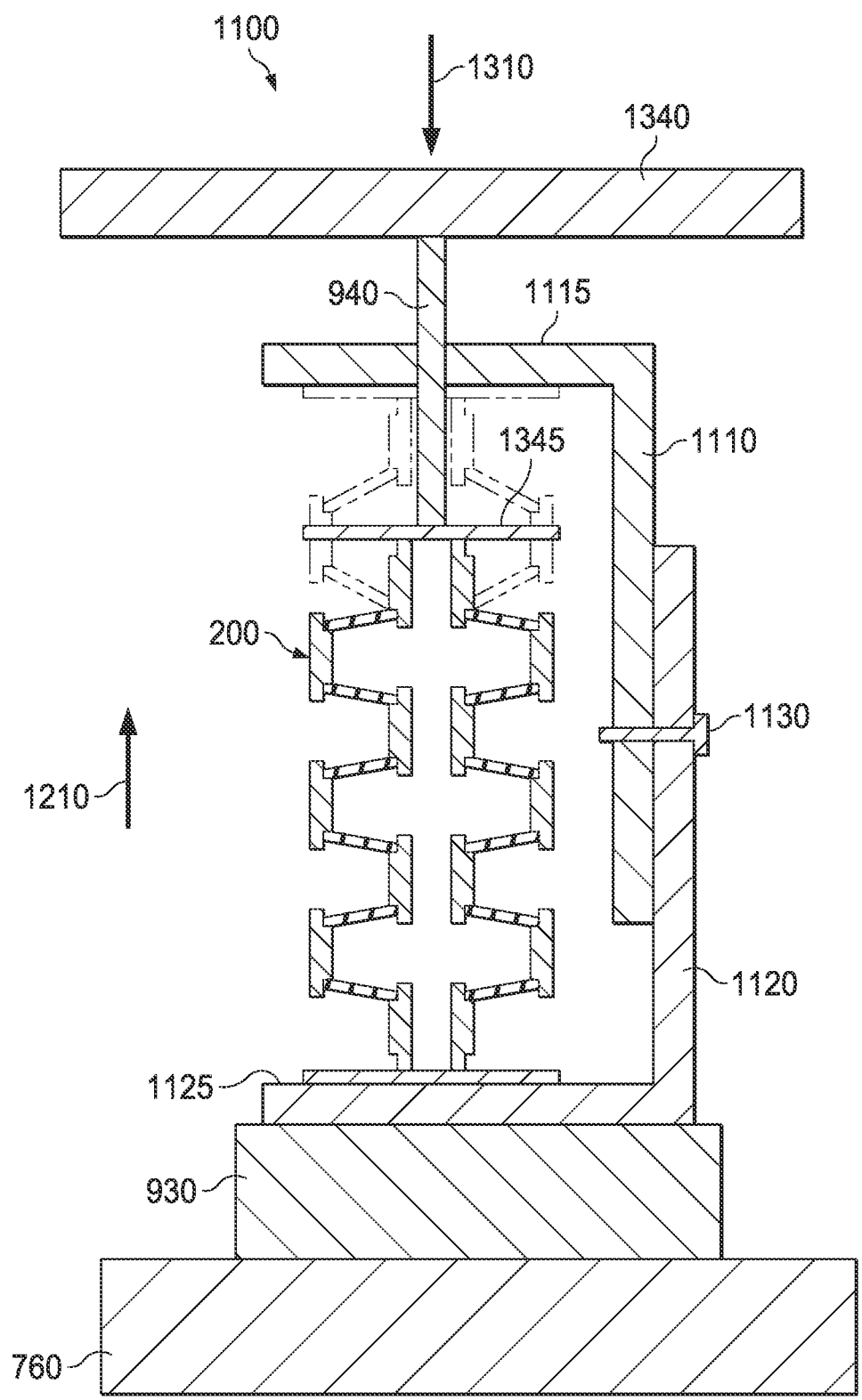
FIG. 13 is a side cross-sectional view of the vibration isolator pre-load mechanism of FIG. 11 in a state where it is both loaded and pre-loaded, in accordance with at least one embodiment of the present disclosure.

FIG. 13 is a side cross-sectional view of the vibration isolator pre-load mechanism 1100 of FIG. 11 in a state where it is both loaded and pre-loaded, in accordance with at least one embodiment of the present disclosure. In this example, the vibration isolator pre-load mechanism 1100 also includes a base plate or base spacer 930 coupled to a seat rail 760. The base plate or base space 930 spacer occupies any extra space between the vehicle floor and the vibration isolator pre-load mechanism. Pin or bolt 1130 has been fixed in place such that the relative positions of top enclosure 1110 and bottom enclosure 1120 maintain a pre-load force 1210 on the spring stack or QZS isolator 200 as shown for example in FIG. 12. Alternatively, it may be said that the spring stack 200 applies an upward force 1210.

However, in this example, the vibration isolator pre-load mechanism 1100 also includes a top plate or load support platform 1340 (which may serve as an attachment point), and a plunger 940 coupled to the top plate or load support platform 1340 and penetrating the top enclosure 1110 (e.g., through an opening) to engage with a top surface or attachment point 1345 of the spring stack or QZS vibration isolator 200. With this arrangement, when a weight, load, or vibration force 1310 greater than the pre-load force 1210 is applied to the top plate or load support platform 1340, the plunger applies this force 1310 to the spring stack or QZS vibration isolator 200, further compressing it. If the pre-load force on the spring stack 200 has been selected to place the spring stack 200 within its QZS range, then forces 1310 that exceed the pre-load force 1210 by even a small amount may result in significant compression of the spring stack 200. Alternatively, it can be said that when the spring stack 200 is compressed beyond its pre-load compression, it generates very little additional upward force. This arrangement is beneficial, as it may tend to keep the QZS vibration isolator within a range where it is particularly effective at limiting the transmission of vibrations (e.g., transmission of vibrations from the seat rail 760 to the top plate or load support platform 1340).

Figure 14:
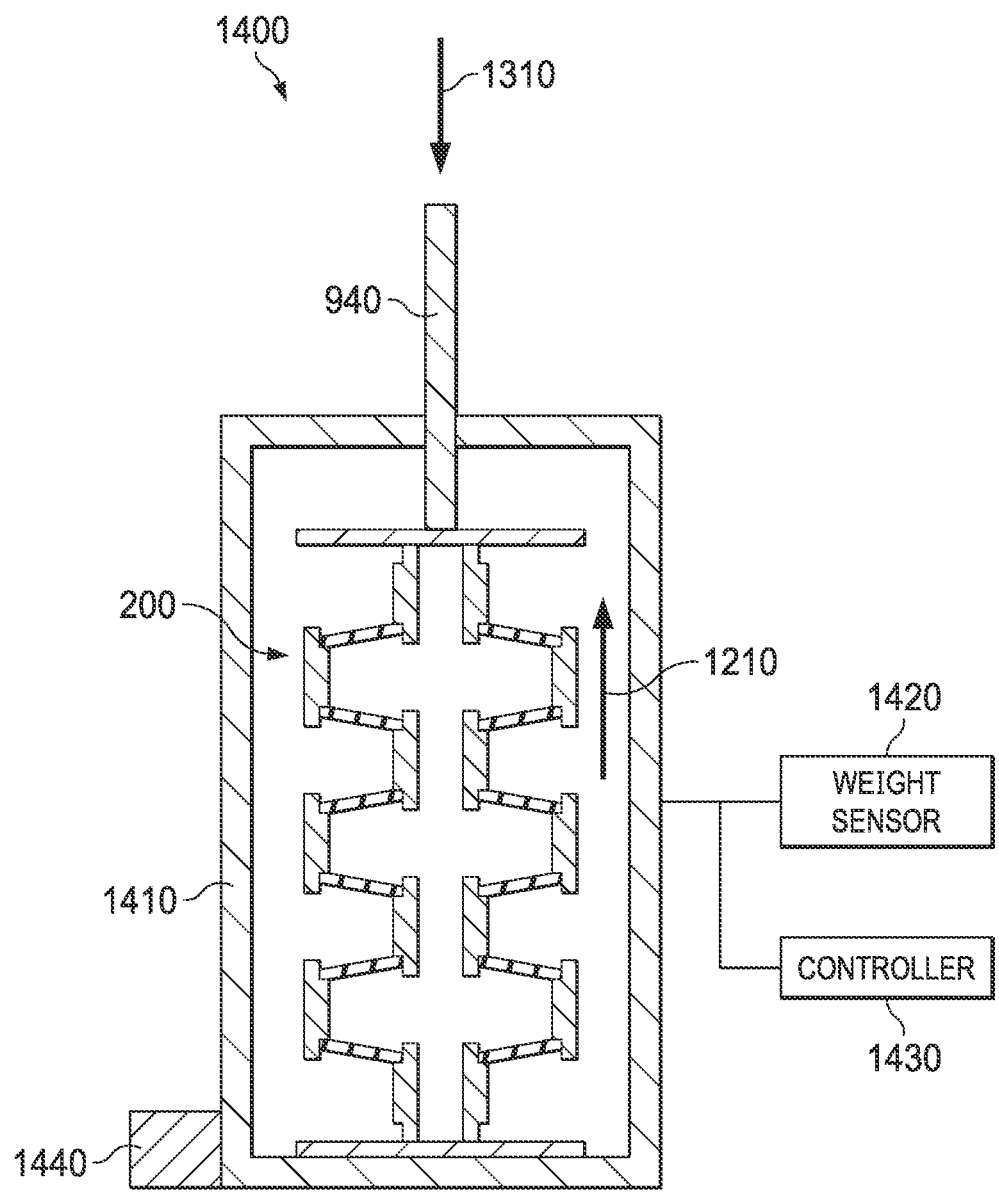
FIG. 14 is a side cross-sectional view of a vibration isolator pre-load mechanism, in accordance with at least one embodiment of the present disclosure.

FIG. 14 is a side cross-sectional view of a vibration isolator pre-load mechanism 1400, in accordance with at least one embodiment of the present disclosure. In this embodiment, the spring stack 200 is at least partially enclosed by a compression fixture 1410, which may for example include a top enclosure 1110 and a bottom enclosure 1120 coupled by a compression motor 1440 capable of exerting a variable pre-load force 1210 on the spring stack 200. The vibration isolator pre-load mechanism 1400 also includes a weight sensor 1420 capable of sensing a weight or other downward force 1310 exerted on the spring stack 200 by the plunger 940. The vibration isolator pre-load mechanism 1400 also includes a controller 1430 configured to receive signals from the weight sensor 1420 and send signals to the compression fixture 1410, such that the pre-load force 1210 can be adjusted based on the applied load 1310, such that the spring stack 200 remains in the QZS region of its force-deflection curve.

In some cases, this adjustment of the pre-load force 1210 may occur only when the load force 1310 experiences a large change (e.g., when a person sits down in a vehicle seat). In other cases, adjustment of the pre-load force 1210 may occur on a set schedule (e.g., every minute or every five minutes), based either on instantaneous values measured at those times, or based on smoothed values that have been averaged over a period of time. In still other cases, adjustment of the pre-load force may occur continuously. The controller may for example be a digital or analog processor configured with a lookup table or other algorithm for relating an input force (e.g., the load force 1310) to an output force (e.g., the pre-load force 1210) to achieve the desired result of keeping the spring stack 200 in its QZS range.

It can be said that FIGS. 11-13 also include a compression fixture, whose components include the pin or bolt 1130, top enclosure 1110, bottom enclosure 1120, and positioning tracks 1140 and 1150. However, in such embodiments, the compression fixture of FIGS. 11-13 may be unpowered (e.g., compressed only by weight placed upon it), or may be powered by human-provided energy (e.g., with a screw or crank) rather than by a motor 1440.

Figure 15:
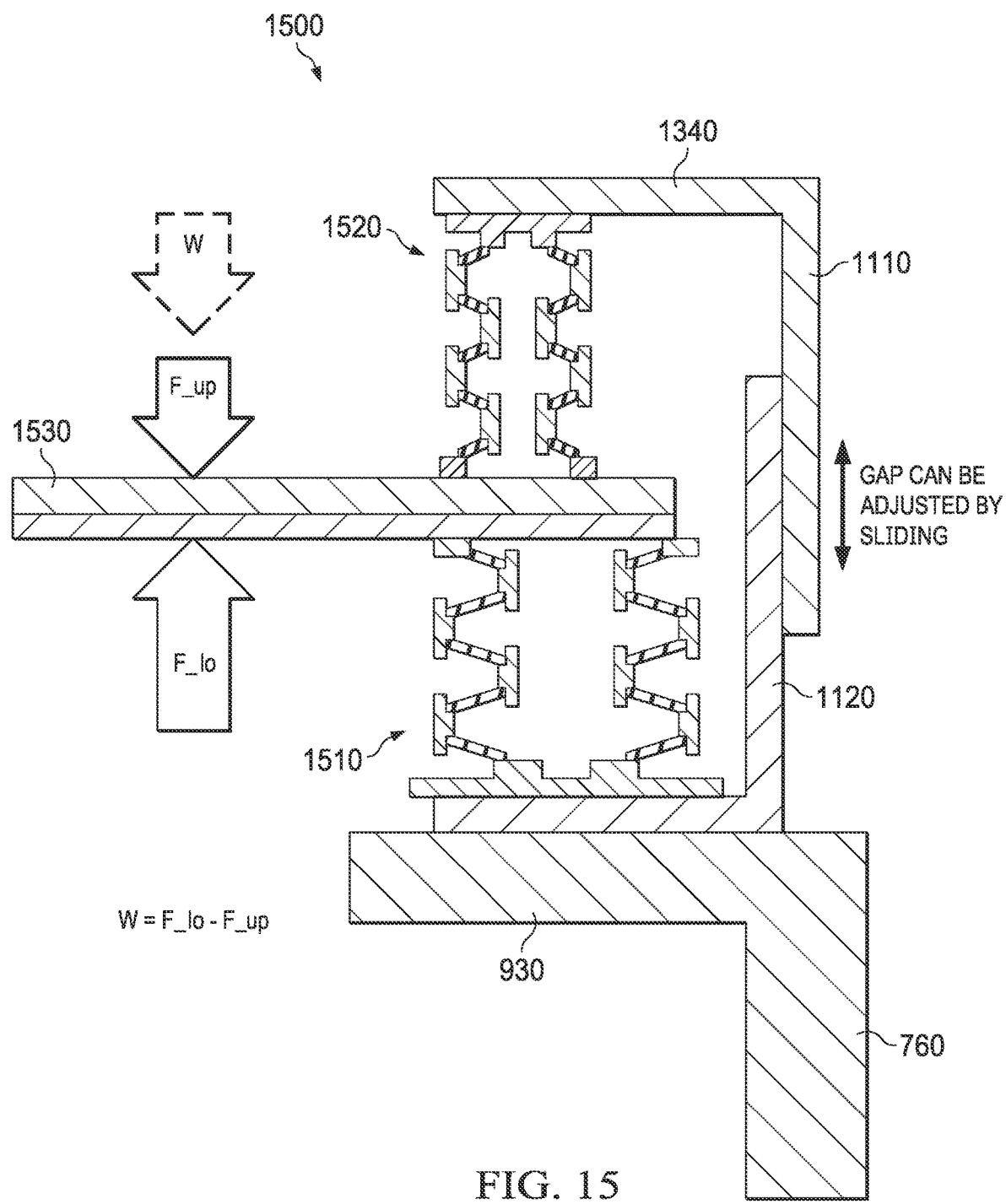
FIG. 15 is a side cross-sectional view of a vibration isolator pre-load mechanism, in accordance with at least one embodiment of the present disclosure.

FIG. 15 is a side cross-sectional view of a vibration isolator pre-load mechanism 1500, in accordance with at least one embodiment of the present disclosure. In this embodiment, the spring stack 200 of FIG. 14 has been replaced with a lower spring stack 1510 and an upper spring stack 1520, separated by a movable control plate 1530. The lower spring stack 1510 and upper spring stack 1520 are partially surrounded by a top enclosure 1110 and bottom enclosure 1120. In some embodiments, the bottom enclosure rests on or is coupled to the base plate or base spacer 930 seat rail 760, vehicle floor 740, or other surface. The top enclosure 1110, bottom enclosure 1120, and control plate 1530 may be portions of, or may be movable by, a compression fixture 1410 as shown for example in FIG. 14, thus applying a pre-load force to the lower spring stack 1510 and upper spring stack 1520.

In the example shown in FIG. 15, the upper spring stack 1520 exerts an expansion force F_up on the movable control plate 1530 (and therefore on the lower spring stack 1510 as well). The lower spring stack 1510 exerts an expansion force F_lo on the control plate 1530 (and therefore on the upper spring stack 1520 as well). Therefore, the weight W that presses down on the vibration isolator pre-load mechanism 1500 is equal to F_lo−F_up, or, alternatively, the expansion force F_lo of the lower spring stack 1510 is equal to W+F_up. In the example shown in FIG. 15, the lower spring stack 1510 is larger than the upper spring stack 1520 and is therefore capable of supporting larger forces and of generating larger counterforces in response. However, this will not be true for all embodiments. The smaller upper spring stack 1520 provides a capability to unload the lower spring stack 1510 outside of its QZS range while still retaining some QZS vibration suppression in the supper spring stack 1520.

In an example, either the control plate 1530 or the upper enclosure 1110 may be free-floating, while the position of at least one of the control plate 1530 or the upper enclosure 1110 is determined by a controller 1430 and motor 1440 as shown for example in FIG. 14, such that the pre-load force on the lower spring stack 1510 and the upper spring stack 1520 can be adjusted, for example, in response to the value of the weight W pressing down on the vibration isolator pre-load mechanism 1500. In some cases, the position of the control plate 1530 or the upper enclosure 1110 is selected such that at least one of the lower spring stack 1510 or the upper spring stack 1520 is in the QZS range of its force-deflection curve. Ideally, the position of the control plate 1530 or the upper enclosure 1110 is selected such that both the lower spring stack 1510 and the upper spring stack 1520 are in the QZS range of their force-deflection curves.

The top surface 1340 of the top enclosure 1110 may be considered a top plate, load support platform, and/or attachment point.

Figure 16:
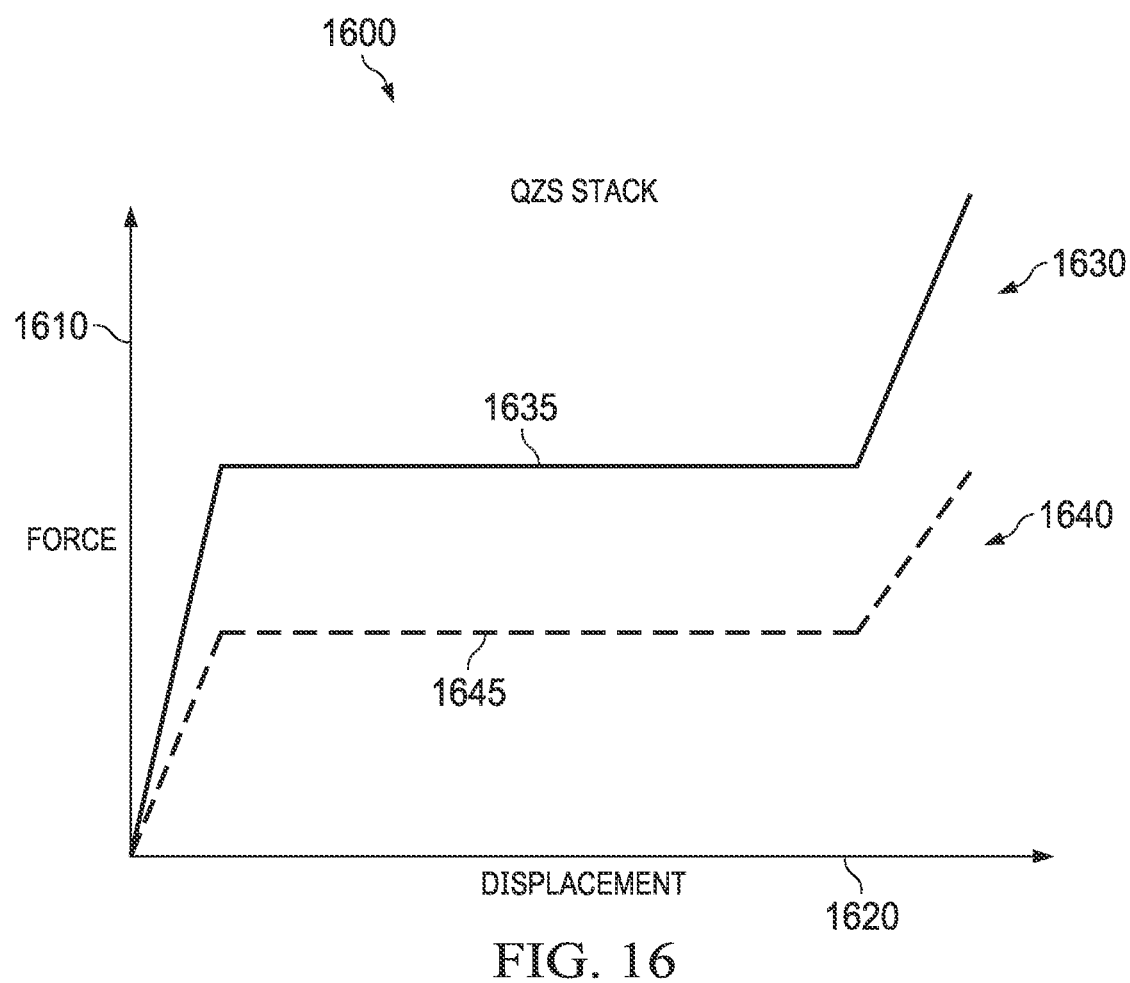
FIG. 16 shows a performance graph of an example QZS isolator at two different levels of pre-load force, in accordance with at least one embodiment of the present disclosure.

FIG. 16 shows a performance graph 1600 of an example QZS isolator at two different levels of pre-load force, in accordance with at least one embodiment of the present disclosure. The graph 1600 shows an approximate relationship between force 1610 and displacement 1620 for a non-preloaded or minimally pre-loaded case 1630, and for a pre-loaded or more significantly pre-loaded case 1640. As can be seen, the non-preloaded case 1630 requires a larger force in order to reach its QZS region 1635, whereas the pre-loaded case 1640 requires a smaller force in order to reach its QZS region 1645. Thus, the QZS isolator in the pre-loaded case 1640 may for example be in its QZS region when a child or small adult is sitting in a vehicle seat, whereas the QZS isolator in the non-pre-loaded case 1630 may for example be in its QZS region when a large adult is sitting in a vehicle seat. It is therefore desirable to adjust the pre-load force on a QZS isolator based on the weight that is placed on it, as shown for example in FIGS. 14 and 15.

As will be readily appreciated by those having ordinary skill in the art after becoming familiar with the teachings herein, the vibration isolator pre-load mechanism of the present disclosure advantageously provides a capability to place an adjustable pre-load force or deflection on a QZS isolator. In some cases, the pre-load force or deflection is adjusted dynamically based on the weight that is placed on the QZS isolator. It should be noted that the examples described above are provided for purposes of illustration, and are not intended to be limiting. Other devices and/or device configurations may be utilized to carry out the operations described herein. A number of variations are possible on the examples and embodiments described above. Depending on the implementation, the positions or orientations may be different than shown herein. For example, although components of the QZS vibration isolator may be shown or described herein as circular, conical, or cylindrical, other shapes with non-circular (e.g., elliptical, polygonal, etc.) cross-sections may be used instead or in addition, for one or more components. The technology described herein may be used in vehicles of other types, including campers, mobile homes, commercial towing vehicles, motorcycles, off-road vehicles, aircraft, and watercraft. The exact configuration of the QZS vibration isolator and/or the vibration isolator pre-load mechanism may be selected to optimize performance for the vibration frequencies and amplitudes expected for such vehicles. The vibration isolator pre-load mechanism may be used for vibration isolators positioned between fixed vehicle components and other vehicle components, including but not limited to seats, engines, engine components, batteries, cargo holds, cargo platforms, wheels, bumpers, and luggage racks.

Accordingly, the logical operations making up the embodiments of the technology described herein are referred to variously as operations, steps, objects, elements, components, or modules. Furthermore, it should be understood that these may be arranged or performed in any order, unless explicitly claimed otherwise or a specific order is inherently necessitated by the claim language.

All directional references e.g., upper, lower, inner, outer, upward, downward, left, right, lateral, medial, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vibration isolator pre-load mechanism. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the vibration isolator pre-load mechanism as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An apparatus comprising:
    a first quasi-zero-stiffness vibration isolator comprising:
        at least two single, separate disk spring washers, wherein each single, separate disk spring washer comprises an inner edge, an outer edge, and a central opening;
        at least one ring-shaped outer spacer having a central through-hole, wherein each outer spacer is coupled to and in contact with the outer edges of one or two single, separate disk spring washers of the at least two single, separate disk spring washers;
        at least one ring-shaped inner spacer having a central through-hole, wherein each inner spacer is coupled to and in contact with the inner edges of one or two single, separate disk spring washers of the at least two single, separate disk spring washers,
        wherein no two disk spring washers of the at least two single, separate disk spring washers are in contact with one another except through an outer spacer of the at least one outer spacer or an inner spacer of the at least one inner spacer;
    a bottom attachment portion configured to support the at least two single, separate disk spring washers; and
    a first top attachment portion configured to, with an application of a first downward force, compress the at least two single, separate disk spring washers;
    a compression fixture configured to apply and hold the first downward force to the first top attachment portion, wherein the compression fixture comprises:
        a bottom enclosure fixedly attached to the bottom attachment portion; and
        a top enclosure configured to move vertically relative to the bottom enclosure and the bottom attachment portion; and
    a second top attachment portion configured to, with application of a second downward force, additional to the first downward force, further compress the at least two single, separate disk spring washers.

2. The apparatus of claim 1, wherein the first top attachment portion comprises a plate or platform.

3. The apparatus of claim 1, wherein the second top attachment portion comprises a plate or platform.

4. The apparatus of claim 1, wherein the second top attachment portion comprises a plunger coupling the first attachment portion to the second attachment portion through an opening in the top enclosure.

5. The apparatus of claim 1, wherein the bottom attachment portion comprises a plate or platform.

6. The apparatus of claim 1, wherein the first downward force is a pre-load force selected to place the at least two separate disk spring washers in a quasi-zero-stiffness (QZS) range.

7. The apparatus of claim 1, wherein the first downward force is a pre-load force selected to place the at least two separate disk spring washers in a quasi-zero-stiffness (QZS) range when the second downward force is applied.

8. The apparatus of claim 1, wherein the compression fixture further comprises a pin or bolt configured to fix a position of the top enclosure relative to the bottom enclosure after the first downward force is applied.

9. The apparatus of claim 1, wherein the compression fixture further comprises a motor configured to apply the first downward force.

10. The apparatus of claim 9, wherein the compression fixture further comprises:
    a sensor configured to measure the second downward force; and
    a controller configured to adjust the first downward force based on the second downward force.

11. The apparatus of claim 10, wherein adjusting the first downward force places the at least two disk spring washers in a quasi-zero-stiffness (QZS) range.

12. The apparatus of claim 10, further comprising a second vibration isolator positioned above the first top attachment portion,
    such that the first downward force compresses the first vibration isolator and uncompresses the second vibration isolator, and
    such that the second downward force compresses both the first vibration isolator and the second vibration isolator, wherein adjusting the first downward force based on the second downward force places at least one of the first vibration isolator or the second vibration isolator in a quasi-zero-stiffness (QZS) range.

13. The apparatus of claim 1, further comprising a second vibration isolator positioned above the first top attachment portion,
   such that the first downward force compresses the first vibration isolator and uncompresses the second vibration isolator, and
   such that the second downward force compresses both the first vibration isolator and the second vibration isolator.

14. The apparatus of claim 4, wherein the plunger is non-threaded.

* * * * *